(12) United States Patent
Yin

(10) Patent No.: US 10,981,668 B1
(45) Date of Patent: Apr. 20, 2021

(54) APPARATUS, SYSTEM AND METHOD OF DATA RECORDING

(71) Applicant: Deryck Yin, Glenelg, MD (US)

(72) Inventor: Deryck Yin, Glenelg, MD (US)

(73) Assignee: AMERICAN STANDARD AEROSPACE PRODUCTS (ASAP), Glenwood, MD (US)

(*) Notice: Subject to any disclaimer, the term of this patent is extended or adjusted under 35 U.S.C. 154(b) by 19 days.

(21) Appl. No.: 16/804,659

(22) Filed: Feb. 28, 2020

(51) Int. Cl.
| | |
|---|---|
| *G06F 7/70* | (2006.01) |
| *G06G 7/00* | (2006.01) |
| *G06G 7/76* | (2006.01) |
| *B64D 45/00* | (2006.01) |
| *B64D 25/20* | (2006.01) |
| *G07C 5/00* | (2006.01) |
| *H04W 4/02* | (2018.01) |
| *H04W 4/90* | (2018.01) |

(52) U.S. Cl.
CPC ............ *B64D 45/00* (2013.01); *B64D 25/20* (2013.01); *G07C 5/008* (2013.01); *H04W 4/026* (2013.01); *H04W 4/90* (2018.02); *B64D 2045/0065* (2013.01); *B64D 2045/0085* (2013.01)

(58) Field of Classification Search
CPC ................... B64D 45/00; B64D 25/20; B64D 2045/0085; B64D 2045/0065; G07C 5/008; H04W 4/90; H04W 4/026
See application file for complete search history.

(56) References Cited

U.S. PATENT DOCUMENTS

| | | | |
|---|---|---|---|
| 8,670,879 B1* | 3/2014 | Angelucci | B64D 45/00 244/1 R |
| 8,880,283 B2 | 11/2014 | Kaufmann et al. | |
| 9,296,489 B2 | 3/2016 | Van Den Heuvel et al. | |
| 9,745,071 B1 | 8/2017 | Wang et al. | |
| 9,975,640 B1 | 5/2018 | Wang et al. | |
| 2010/0063654 A1* | 3/2010 | Winterhalter | G01S 5/18 701/14 |
| 2016/0257415 A1* | 9/2016 | Ye | B64D 17/00 |

(Continued)

FOREIGN PATENT DOCUMENTS

GB          1288076 A     *    9/1972          B64D 45/00

OTHER PUBLICATIONS

"Cockpit Voice Recorders (CVR) and Flight Data Recorders (FDR)", National Transportation Safety Board, Jan. 8, 2020.

*Primary Examiner* — Harry Y Oh
(74) *Attorney, Agent, or Firm* — Sughrue Mion, PLLC

(57) ABSTRACT

A data recording apparatus, data recording system and an orientation determination method thereof is disclosed. The data recording apparatus may include a housing, a wireless communication interface, one or more memories that store executable code; and one or more processors configured to execute the executable code, which causes the one or more processors to: control the communication interface to obtain data from Flight Data Acquisition Unit (FDAU) and store the obtained data in the one or more memories. The obtained data may include one or more of flight data, cockpit data (e.g., cockpit voice data), or cabin data (e.g., cabin voice data). The data recording apparatus may include a detachable attachment means for allowing the data recording apparatus to separate from the airplane in the event of a crash via a passive detachment means.

20 Claims, 28 Drawing Sheets

(56) References Cited

U.S. PATENT DOCUMENTS

| | | | |
|---|---|---|---|
| 2017/0288738 A1* | 10/2017 | Lee ...................... | H04W 52/42 |
| 2017/0291715 A1* | 10/2017 | Jayathirtha ...... | G06Q 10/06316 |
| 2018/0044034 A1* | 2/2018 | Newman .............. | H04B 7/1851 |
| 2018/0232970 A1* | 8/2018 | Satyanarayana ....... | B64D 45/00 |
| 2019/0270523 A1* | 9/2019 | Murphy ................ | B64D 25/20 |

* cited by examiner

202

300

300

APPARATUS, SYSTEM AND METHOD OF DATA RECORDING

BACKGROUND

Field

This disclosure is directed towards recorders used in airplanes (e.g., flight data recorders, voice recorders, or a combination thereof), which are commonly referred to as a "black box". For example, flight data recorders may record flight data, and voice recorders may record voice data, such as, cockpit voice data. The disclosure is directed towards a data recording apparatus, a data recording system and an airplane orientation and integrity determination method thereof that solves problems existing in the related art.

Description of Related Art

A Cockpit Voice Recorder (CVR) and a Flight Data Recorder (FDR) are traditionally two separate physical units used for different purposes.

A Cockpit Voice Recorder (CVR) may record sounds, such as, sounds on a flight deck with an area microphone, usually mounted on an overhead panel of a cockpit. The area microphone may be a sensitive microphone that may capture sound, which may include one or more of: one or more voices, one or more sounds of switches, one or more audible warnings, and/or other cockpit noise. The CVR may also record audio from one or more microphones (e.g., one or more of: a pilot's headset microphone, an oxygen mask microphone or a handheld microphone). Each pilot of a plurality of pilots may have the same or a similar microphone configuration.

A Flight Data Recorder (FDR) may record data obtained from Flight Data Acquisition Unit (FDAU). A Flight Data Acquisition Unit (FDAU) is a unit that receives various discrete, analog and digital parameters from a number of sensors and avionic systems and then routes them to Flight Data Recorder (FDR). The FDAU may include a hardware processor. The data may include many different operating conditions of a flight of the airplane. In some jurisdictions (e.g., the United States), the aviation regulations require that newly manufactured aircraft must monitor at least eighty-eight (88) important parameters including time, altitude, airspeed, heading, and aircraft attitude. In addition, some FDRs can record the status of more than a thousand (1,000) other in-flight characteristic parameters that can aid in an investigation (e.g., an investigation into an airplane crash).

Due to technological advancement, the functionalities of the Cockpit Voice Recorder (CVR) and Flight Data Recorder (FDR) can be integrated into one physical unit. The one physical unit that includes the CVR and the FDR may be called a Cockpit Voice and Data Recorder (CVDR). The scope of the present disclosure is to provide one physical unit that addresses problems with the CVDR. See, for example, Non-Patent Literature 1. The term "black box" is commonly used to refer to a FDR, a CVR or both.

Listing of Related Art

Patent Literature 1: "Wang" U.S. Pat. No. 9,745,071 ("Ejectable Flight Data Recorder Systems, Methods, and Devices").

Patent Literature 2: "Van den Heuvel" U.S. Pat. No. 9,296,489 (Flight Recorder Deployment Mechanism).

Patent Literature 3: "Kaufmann" U.S. Pat. No. 8,880,283 ("Deployable Flight Recorder").

Patent Literature 4: "Wang2" U.S. Pat. No. 9,975,640 ("Ejectable Flight Data Recorder Systems, Methods, and Devices").

Non-Patent Literature 1: "Cockpit Voice Recorders (CVR) and Flight Data Recorders (FDR)"; published by "National Transportation Safety Board" (Jan. 8, 2020). Non-Patent Literature 1 shows a black box that records both cockpit voice data and flight data.

Non-Patent Literature 2: "Effect of welding parameters on tensile strength of ultrasonic spot welded joints of aluminum to steel—By experimentation and artificial neural network" Article in Journal of Manufacturing Processes 30:63-74 December 2017. Non-Patent Literature 2 discloses a study regarding tensile strength of welded joints.

Problem(s) to be Solved

The present disclosure addresses a multitude of problems associated with black boxes (for aircraft) in the related art, as discussed in more detail below.

A black box, which is generally located inside of an airplane, may be partially or completely destroyed in the event of an airplane crash, or, the black box may sink with the airplane into deep water (if the airplane lands/crashes into deep water). In either situation, the data stored in the black box, which is important for crash investigators, may no longer be retrievable.

Various methods in the related art have been proposed that provide a method of actively ejecting the black box. For example, Patent Literature 1 (Wang) shows a method and system for ejecting a black box (flight data recorder) in the event that a problem or crash is detected such that the black box is ejected before an airplane crashes. In Wang, a "pre-crash" ejection is designed to preserve the integrity of the black box. However, there are many problems with the design of ejectable black boxes (e.g., Wang's).

Ejection Causes Loss of Important Data

For example, by design, the deployable black box of Wang is not going to record flight data or cockpit voice data (voice data from the cockpit) in the last moments of an emergency (because it will have been deployed). However, the data recorded during the last moments of an emergency (important data) is generally the most critical for investigators to determine the exact cause of the emergency. That is, if the ejection method is used (e.g., Wang's ejection method), the investigators and manufacturer will lose the most important information.

Active Ejection Prone to Malfunction

Also, active mechanical devices need to support ejection functionalities to ensure the proper operations. However, active mechanical ejection devices (e.g., Wang's ejection method) are prone to malfunction caused by the emergency. That is, in Wang, an "eject" condition is analyzed and a conclusion is drawn by a software algorithm based on multiple flight operating parameters.

However, both ejection control systems and ejection control devices are generally not protected as well as the black box is (e.g., different materials are used for the respective housings). Thus, in the event a violent accident occurs on an airplane, the ejection control systems and/or the ejection devices may be damaged, thereby preventing the black box from being ejected. That is, the ejection control system may not eject in time, if at all. Moreover, in an opposite respect, a sensor malfunction, a flight communication glitch or a black box software glitch can cause erroneous calculation(s), which may lead to a premature ejection in Wang. In Wang, the ejection compromises airplane body integrity. Thus, a premature ejection can destroy the airplane when no crash/emergency is actually imminent.

Moreover, the design of a parachute for the black box in Wang is such that the black box needs to be deployed way ahead of the crash. However, if the ejection control system/device is damaged, the black box may not be deployed such that the parachute opens properly in time.

The ejection of the black box in Wang creates another potential problem: the ejected black box may be hit by, for example, a part of the airplane, such as, the vertical stabilizer of the airplane because the plane is still moving at a very high speed. When the ejected black box is hit by, for example, the vertical stabilizer while the plane is moving at a very high speed, damage to both the black box and airplane will occur.

Patent Literature 2 (Van den Heuvel) is a black box separation method based on an electro-mechanical mechanism to release the black box before the expected crash. Van den Heuvel is focused on the releasing device.

Van den Heuvel is concerned about the survivability of the black box and wants the black box to be released before the crash to preserve the data. If the black box is released when the airplane still flies, the recovery of the black box is extremely difficult. First of all, the area of search can cover as large as hundreds of square miles. If it lands on the ground, the momentum of the black box may make the black box penetrate a surface layer. If it lands on water, the black box will sink to the bottom of the water. Without GPS coordinates being transmitted/broadcasted, or assistance from a parachute or floatation device, it is difficult for a search team to find the black box separated from the airplane, which is a much larger target.

Patent Literature 4 (Wang2) uses an ejection device to eject the flight data recorder when the ejection controller determines the condition is met. Wang2 uses a polycarbonate material (i.e., plastic) for the housing of the ejectable flight data recorder to reduce weight. See, e.g., col. 35, line 2, of Wang2. However, a black box made of polycarbonate material won't pass at least some government regulations (e.g., won't pass U.S. Federal Aviation Administration (FAA) regulations regarding force and temperature tests). Moreover, polycarbonate is not practical.

However, the use of active ejection devices introduces new risks. When emergencies occur onboard an airplane, a software glitch or hardware malfunction during the chaotic situation can prevent the flight data recorder from being ejected. Also, the ejection process may break a frangible panel opening configured to break on the airplane skin. See, col. 30, line 52, of Wang2. That is, Wang2 will leave a hole in the airplane and cause disintegration of the airplane. In some case, the airplane emergency can be recovered. However, due to determination of the ejection controller and ejection of the black box, the airplane will disintegrate and can not be saved. Therefore, Wang2 does not offer a practical solution.

Most recent related prior art are focused on how to use active devices to eject black boxes from the airplane. In contrast, the present disclosure, according to an embodiment, uses a passive detachment design to make sure the data recording apparatus (also referred to as an Integrated Flight Information Unit (IFIU) throughout the specification) will break away when sheer force exceeds a threshold value (the threshold value may correspond to an airplane crash). At the same time, in an embodiment, the data recording apparatus does not require any other device, which could fail, thereby eliminating the possibility of a software glitch or hardware malfunction. In this regard, the data recording apparatus can be installed in a mounting well by using mounting bolts (e.g., six mounting bolts).

Each of the mounting bolts may be specifically rated at predetermined tensile strength level. When an airplane crash occurs, those bolts may break to release the data recording apparatus.

There are many "ejectable" or "deployable" black box designs trying to save the black box and prevent it from sinking with the airplane to the bottom of the ocean. The related art Wang mentions that the black box is going to be ejected from the airplane before or at the moment of crash. This design relies on the onboard processor (ejection controller) or computer hardware and software algorithm to determine the condition of the airplane. Wang most likely makes such a determination based on sensor inputs, data communication from Flight Data Acquisition Unit (FDAU). That is, the IFIU/data recording apparatus also may pull flight information from FDAU, but does not rely on the flight information for detachment. That is, the flight data may be obtained from unreliable data sources during an emergency onboard. It is a mistake to assume that any of the emergencies won't impact any of the data points or communication lines. Even if data sources and FDAU all work, the ejection or deployment device can be disabled or jammed.

In view of the problems with the related art as discussed above, a need exists in the art for a passive mechanical mechanism, which may be the most reliable solution, for separating the black box from the airplane. The passive mechanical mechanism may be configured to cause the black box to separate, in the event of a crash, without the need to perform a software algorithm for detecting the crash, and subsequently controlling to eject the black box.

To survive an airplane crash, the data recording apparatus 100 needs to be broken away from the airplane. To achieve this goal, according to an embodiment, mounting bolts are used to mount the data recording apparatus 100 through a data recording apparatus mounting well. Six mounting bolts are shown in, for example, FIG. 3C, but a different number of mounting bolts could be used (e.g., 3 or more mounting bolts could be used). The mounting bolts may be constructed of two different materials, but more than two different materials may be used. The bolts are inserted from threaded holes at the bottom of the data recording apparatus mounting well and threaded into the bolt holes on the lower portion of the data recording apparatus 100. There may be a small portion of the mounting bolt in the middle of the mounting bolt that is not supported by any threads.

A passive mechanical mechanism can be used so that the data recording apparatus passively detaches when a crash occurs. For example, multiple mounting bolts may be used to secure the data recording apparatus in a cavity (e.g., in a cavity provided by a data recording apparatus mounting well) on the roof of the fuselage of the airplane. These mounting bolts may be configured to break at the time of an actual crash. With this approach, the location of the detached data recording apparatus may be in the proximity of the airplane near a time of the airplane crash.

Moreover, the related art has a problem with recovery of the ejected black box. For example, the most recent development in the communication industry made it possible to have some data transmitted from the airplane to the satellites. However, due to the data bandwidth limit on the satellites, most data will be saved in the black box locally.

In this regard, the recoverability of the black box is the most critical mission of all black box designers.

According to an embodiment of the disclosure, the data recording apparatus may use a strong yet lightweight material for the housing of the data recording apparatus. For example, the material used for the housing of the data recording apparatus may meet all current local aviation agency (e.g., the U.S. Federal Aviation Administration (FAA)) requirements for force, temperature and hit tests. Accordingly to an embodiment, the design may ensure that the data recording apparatus can break away from the airplane in the case of an accident.

The data recording apparatus may be configured to be attached to an airplane and may be configured to be detachable from the airplane in the event of a crash. The data recording apparatus, while attached to the airplane, may be flush with an outer surface of the airplane.

Buoyancy

Patent Literature 3 (Kaufmann) is very similar to Van den Heuvel. Van den Heuvel discloses a black box, which is mounted on a spring on the external wall of the airplane, which can be released when the airplane is in emergency situation. In Kaufinann, the word "float" only appears once, and it is relation to the airfoil. See col. 3, line 52 ("[i]n the event of an incident over water, or even in a controlled ditching situation, a beacon in the deployable airfoil unit can float indefinitely in freshwater or sea water"). Kaufmann includes no description of the recorder material, design or external supporting devices to make it "float". However, if the black box is in fact ejected over water, Kaufmann has a problem in that the black box would sink.

According to an embodiment, the volume displacement of the data recording apparatus may be calculated to support the weight of the data recording apparatus so as to allow the data recording apparatus to float on the surface of water without additional assistance. The passive detach mechanism may be the most reliable approach for practical use.

All of the related art that focuses on an ejectable black box focus on how to separate the black box from the airplane and mention very little or no design detail of the black box itself. Some of the related art even make search task more difficult or introduce more risk to the airplane.

According to an embodiment, the data recording apparatus of the disclosure may have multiple layers of measurement to ensure quick and safe recovery of the unit. First of all, the data recording apparatus may broadcast, in real time via satellite network, its Global Positioning System (GPS) coordinates. Moreover, for example, a rapid decent in altitude may automatically trigger a "crash" warning at ground stations. The data recording apparatus may continue sending its GPS coordinates data after it lands, either on the ground or on the water. Second, passive detachment can make the data recording apparatus break away from the airplane. The touch-less design of power and communication modules makes separation easy. Third, self-float weight and body shape design ensures that the detached data recording apparatus does not sink if the airplane crashes into the water.

In addition, according to an embodiment, battery-powered LED beacon lights and the GPS coordinate broadcast function help the rescue team quickly locate and recover the data recording apparatus, when, for example, communication between the data recording apparatus and FDAU is broken.

Airplane Orientation and Integrity Determination

In addition, as in the case with all previous airplane crashes, the investigators were unable to identify how the airplanes oriented and when they disintegration around the time of the crash, due to lacking of useful sensor data. That is, the related art does not provide a method of determining airplane orientation and integrity. The present disclosure includes a determination method that is used, in conjunction with two data recording apparatuses, to solve at least these problems with the related art (as discussed in more detail below).

Data Encryption

In addition, most airplane accidents that occur involve multiple governments and jurisdictions. Due to lacking of trust among parties involved, there is a need in the related art for data encryption (e.g., the flight data, multimedia file(s), GPS data) to prevent unauthorized access and potential evidence tampering or alteration. The present disclosure proposes a data encryption method including a multi-passcode encryption key to address at least these problems with the related art.

SUMMARY

According to an embodiment of the disclosure, a data recording apparatus (or also referred to as an Integrated Flight Information Unit (IFIU)) may include: a housing, a wireless communication interface, a wireless power charging interface, one or more memories that store executable code, and one or more processors configured to execute the executable code, which causes the one or more processors to: control the communication interface to obtain data from Flight Data Acquisition Unit (FDAU); and store the obtained data in the one or more memories.

According to an embodiment of the disclosure, the data recording apparatus may further comprise an attachment means for attaching the housing directly or indirectly to a fuselage of an airplane.

According to an embodiment of the disclosure, the attachment means may have a strength that causes detachment to occur at a predetermined threshold value.

According to an embodiment of the disclosure, the predetermined threshold value may correspond to a tensile strength value that causes detachment when an airplane crash occurs. For example, the tensile strength range may correspond to a predetermined PSI (pounds per square inch) in which the attachment means will break in the event of a crash. The ultimate tensile strength can be widely different based on alloy composition.

According to an embodiment of the disclosure, the attachment means may include one or more mounting bolts that include at least a portion of which have the strength that causes detachment to occur at the predetermined threshold value.

According to an embodiment of the disclosure, the one or more bolts may include at least two portions, the at least two portions including a first portion having a first tensile strength and a second portion having a second tensile strength, the first tensile strength being different from the second tensile strength.

According to an embodiment of the disclosure, the second tensile strength may be lower than the first tensile strength so that the one or more bolts is configured to break at the second portion during a crash of an airplane.

According to an embodiment of the disclosure, the first portion and a third portion of the bolt may have the first tensile strength, and the second portion of a bolt may have the second tensile strength.

According to an embodiment of the disclosure, the second tensile strength is lower than the first tensile strength so that the one or more bolts is configured to break at the second portion during a crash.

According to an embodiment of the disclosure, the data recording apparatus may further comprise a beacon, wherein the one or more processors are further configured to execute the executable code, which causes the one or more processors to, cause the beacon to flash intermittently when communication between the data recording apparatus and FDAU is broken.

According to an embodiment of the disclosure, the one or more processors may be further configured to execute the executable code, which may cause the one or more processors to: when powered on, determine whether or not the startup is an initial startup; if the startup is an initial startup, transmit information to a user terminal (e.g., a touch screen display device) that prompts users to enter required passcode information; based on users entering information in response to the information that prompts the user to enter the required passcode information, attempt to validate the passcode based on its format; and if validation is successful, encrypt at least a portion of the memory where data (e.g., flight data and other multimedia files) are stored.

According to an embodiment of the disclosure, the one or more processors are further configured to execute the executable code, which causes the one or more processors to: when powered on, determine whether or not the startup is an initial startup; if the startup is determined to not be the initial startup, determine whether or not normal communication with FDAU is established; and if normal communication with FDAU is not established, perform at least one of the following tasks: controlling an emergency beacon to turn on, or transmitting GPS coordinates via a satellite communication interface.

According to an embodiment of the disclosure, the one or more processors are further configured to execute the executable code, which causes the one or more processors to: if normal communication with FDAU is established, check to determine whether there is any alarm, warning, abnormality or fault that has occurred based on data transmitted by FDAU via the wireless communication interface; and based on determining that there is an alarm, warning, abnormality or fault that has occurred based on the data transmitted by FDAU that is received via the wireless communication interface, pull data at a faster rate than a rate at which the data is pulled in a normal situation where no alarm, warning, abnormality or fault has been detected, wherein the faster data rate corresponds to increasing a frequency of controlling the wireless communication interface to obtain data from FDAU such that data pulled from FDAU is obtained more frequently.

According to an embodiment of the disclosure, the housing may include a material and an internal volume that are designed such that the data recording apparatus floats on water.

According to an embodiment of the disclosure, the data recording apparatus may further comprise a wireless charging interface and a battery.

According to an embodiment of the disclosure, the power of the data recording apparatus can not be turned off from inside of an airplane that the data recording apparatus is attached to. That is, the data recording apparatus, which may be mounted to an outer surface of the airplane, may only be turned off from outside of the airplane.

According to an embodiment of the disclosure, the one or more processors are configured to, based on detecting that at least one of a communication connection or a power connection between the data recording apparatus and FDAU is broken, determine that the airplane is in an emergency situation and transmit a distress signal.

According to an embodiment of the disclosure, a system is provided that comprises: the data recording apparatus device as described above; and a mounting well mounted on the outside of the fuselage of the airplane from the inside of the fuselage of the airplane, the mounting well being configured to connect the data recording apparatus to the airplane.

According to an embodiment of the disclosure, an airplane is provided that includes the data recording apparatus as described above; and a mounting well mounted on the outside of the fuselage of the airplane from the inside of the fuselage of the airplane, the mounting well being configured to connect the data recording apparatus to the fuselage of the airplane.

According to an embodiment of the disclosure, the mounting well may include two mounting wells, a first mounting well of the two mounting wells may be positioned on a front portion of the fuselage, and a second mounting well of the two mounting wells may be positioned on a rear portion of the fuselage, the rear portion of the fuselage being located closer to the tail of the airplane than the front portion of the fuselage.

According to an embodiment of the disclosure, a system is provided that comprises the airplane as described above including two data recording apparatuses provided in two respective mounting wells, and the one or more processors of each of the two data recording apparatuses may be further configured to store location data regarding GPS coordinates of the respective data recording apparatuses, which can be used later by an electronic device to determine one or more of the followings: airplane orientation or integrity of the airplane. The system may also include an electronic device that is configured to read the GPS coordinates stored in the respective memories of the two data recording apparatuses and determine airplane orientation and integrity based on the saved GPS coordinates.

According to an embodiment of the disclosure, a determination method may include: obtaining, by an electronic device, from a memory of a first data recording apparatus, first GPS coordinates stored in the memory of the first data recording apparatus; obtaining, by the electronic device, from a memory of a second data recording apparatus, second GPS coordinates stored in the memory of the second data recording apparatus; and based on the obtained first and second GPS coordinates, determining, by the electronic device, orientation and integrity of the airplane that the first and second data recording apparatuses are attached to. The electronic device may include a hardware processor and the memory. The electronic device may be a computer.

BRIEF DESCRIPTION OF THE DRAWINGS

The disclosed subject matter, including features will be more apparent from the following detailed description and the accompanying drawings in which.

DETAILED DESCRIPTION

System Components

In an embodiment of the disclosure, a data recording apparatus may be comprised of one or more of: one or more controllers (e.g., a system controller), communication interfaces (e.g., including a satellite communication interface and a GPS communication interface) and one or more antennas, one or more emergency beacons, a wireless communication interface, one or more power charging interfaces, and data storage (e.g., one or more memories). In this regards, the communication between the data recording apparatus and FDAU may be wireless, which ensures quick detachment when a crash occurs (as discussed below).

Also, a user terminal may be provided (e.g., in the cockpit, or a separate area not in the cockpit). The data recording apparatus may be connected to the user terminal (via wireless connection) and the one or more controllers may be configured to transmit information to the user terminal (e.g., in the cockpit) so that the user terminal prompts the users to input data encryption passcodes. Once passcode validation succeeds, the one or more controllers may encrypt the digital storage of the data recording apparatus to prevent unauthorized access.

Figure 1:
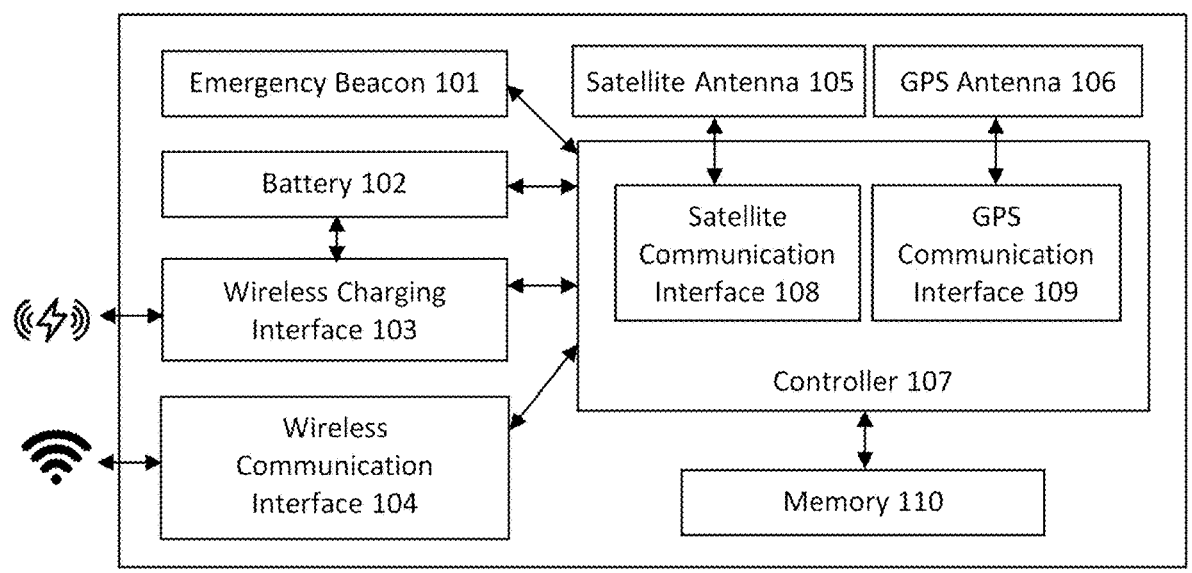
FIG. 1 is a schematic illustration of a block diagram of a data recording apparatus in accordance with an embodiment of the disclosure.

FIG. 1 is a schematic illustration of a block diagram of a data recording apparatus 100 (also referred to as an integrated flight information unit (IFIU)) according to an embodiment of the present disclosure. The data recording apparatus 100 may include a controller 107 and one or more memories 110 (data storage). The one or more memories 110 may hereinafter be referred to as a memory 110. The memory 110 may store computer code that includes instructions, which when executed by the controller, causes the controller to execute various functions. The various functions pertinent to this disclosure are explained in detail below. However, other functions that are known to one or ordinary skill in the art could also be performed. The controller 107 may be configured to obtain data from FDAU, and store the obtained data in the one or more memories 110. The obtained data may include one or more of the followings: cockpit data, cabin data, flight data or airplane data (e.g., airplane status data). The cockpit data may include, for example, one or more of audio, video or image data from in or within a vicinity of a cockpit of an airplane. The cabin data may include, for example, one or more of audio, video or image data from in or within a vicinity of a cabin of the airplane, but the cabin data may include data recorded from other parts of the airplane. The obtained data may include other data related to the airplane or flight of the airplane. The obtaining of the data may include receiving the data via a wireless communication interface 104.

The controller 107 may include one or more processors and/or may include an Application Specific Integrated Circuit (ASIC).

The memory may include one or more storage devices and associated media, such as, a solid state drive. However, other types of media may be used such as any other type of data recording media or recording device, known now or in the future. Moreover, the SSD of the data recording apparatus may be removed and read by another electronic device (as discussed more in detail throughout the specification.

"Computer readable media" or "computer readable medium" as used in connection with the specification encompass non-transitory computer readable media. The non-transitory computer readable media may include computer code for performing various computer-implemented functions (see, e.g., FIG. 9). The media storing the computer code may be specifically designed or constructed for the present disclosure, or may be common media.

As an example, the controller 107 may provide functionality as a result of processor(s) (including CPUs, GPUs, FPGA, accelerators, and the like) executing software embodied in one or more tangible, computer-readable media. Such computer-readable media may be media associated with a storage device, or with internal mass storage (e.g., Read-Only Memory (ROM) or Random Access Memory (RAM)).

The software implementing various embodiments of the present disclosure can be stored in the storage devices and executed by the controller 107.

A non-transitory computer-readable medium can include one or more memory devices or chips. The non-transitory computer-readable medium may include computer code that, when executed, causes the controller 107 to execute processes described herein. In addition or as an alternative, the controller 107 may provide functionality as a result of logic hardwired in a circuit (e.g., ASIC), which can operate in place of or together with software to execute particular processes or particular parts of particular processes described herein. Reference to a non-transitory computer-readable media may include a circuit (such as an integrated circuit (IC)) that stores computer program code for execution, a circuit embodying logic for execution, or both. The present disclosure encompasses any suitable combination of hardware and software.

The data recording apparatus 100 may further include the wireless communication interface 104, which may be configured to receive data transmitted from one or more devices, such as, FDAU. The wireless communication interface 104 may also be configured to transmit, via, for example, control by the controller 107, data to the one or more devices (e.g. a user terminal).

The one or more devices that the data (e.g., flight data, voice data) is transmitted from may include FDAU.

The data recording apparatus 100 may also include interface to one or more communication networks (e.g., via the wireless communication interface 104). Networks may be, for example, wired, wireless, or optical. Networks can further be a local area network (LAN). However, other types of networks may be used such as any other type of network, known now or in the future. Further, NFC, Bluetooth or short range wireless communication may be used.

Using any of these networks, the data recording apparatus 100 can communicate with other devices. Such communication can be uni-directional, receive only (for example, flight data and voice cockpit data), or bi-directional, for example to other devices using, for example, local area digital networks.

The data recording apparatus 100 may include a power supply. For example, as shown in FIG. 1, the data recording apparatus 100 may include, as a power supply, a battery 102, which may be charged via a wireless charging interface 103. The wireless charging interface 103 may be configured to receive power from one or more wireless power transmission interfaces on the airplane (i.e., a wireless charging interface that supplies the outgoing power). However, the disclosure is not limited to the power supply system/means (battery 102 and wireless charging interface 103) shown in FIG. 1, and other power supply means may be suitable, for example, a solar power interface may be included on, for example, an outer surface of a housing (discussed more below) of the data recording apparatus 100. The solar power interface (not shown) may convert natural light into power that may be stored in, for example, battery 102. In an embodiment, a capacitor can be used as a power source instead of a battery because a battery can quickly wear out and lose its capacity under extreme temperature.

In an embodiment, the power of the data recording apparatus may only be turned off by someone from outside of the airplane (i.e., the power supply can not be turned off from inside of an airplane that the data recording apparatus is attached to). That is, the data recording apparatus 100 may have an "always-on" configuration with battery back-up, according to an embodiment.

In this regard, the battery 102, which may be internal batteries, may be charged via the wireless charging interface, when external power is present. When external power is not available, the controller 107 may operate using battery power as a power source. With this configuration, the controller may continuously log data (e.g., flight data) and/or broadcast its GPS coordinates until the battery (or batteries) is exhausted.

The data recording apparatus 100 may be installed in a mounting well (described below), which may be separated from the airplane cabin, and may obtain data and power via wireless means. The data recording apparatus 100, in an embodiment, cannot be turned off by anyone inside of the airplane without damaging airplane body integrity. In this regard, the data recording apparatus may be tamperproof.

When at least one of the engines is running, the controller may obtain data from FDAU and transmit location information (e.g., GPS coordinates) to a centralized server via the satellite communication interface. The obtaining of data and transmitting of location information may be accomplished automatically without intervention from a user (e.g., the pilot or anyone else on the airplane). In almost every hijack situation, the airplane transponder was turned off intentionally trying to hide its track. In, for example, the mysterious 2014 disappearance of Malaysian Airlines Flight 370 (MH370), the transponder was turned off as well. Although the disclosed data recording apparatus may not replace a traditional aircraft transponder; it ensures authorized parties can find out whereabouts of the airplane at any time (based on the transmitted location information), which was different than in the case of MH370 where the location of the airplane was difficult/impossible to be determined.

When at least one airplane alarm or fault is active, the data recording apparatus may collect data from FDAU at an emergency rate (e.g. 10 times per second), which is much faster than a normal rate (e.g. once every minute), to provide more data points for future investigation of the alarm or fault. If data recording apparatus communication with FDAU is broken, the data recording apparatus may detect this condition, and, based on detecting the condition, send out its GPS coordinates (e.g., via the satellite communication interface) and turn the emergency beacon on. These tasks can be accomplished by using either airplane power or the battery or batteries.

The wireless charging interface 103 may be a wireless power interface that may also (or only) supply power directly to the controller 107. In an embodiment, the wireless power interface may be included instead of the wireless charging interface 103 so as to supply power only when a wireless power transmission interface is in the vicinity such that power can be transmitted wirelessly. Of course, a wired charging and/or power interface may be used instead of the wireless charging and/or power interfaces.

The data recording apparatus 100 may further comprise one or more antenna(s). For example, the one or more antennas may comprise at least one of or both of the followings: a satellite antenna 105 or a global positioning system (GPS) antenna 106. However, the one or more antennas may include one or more different antennas instead of or in addition to the at least one of or both of the followings: a satellite antenna 105 or the GPS antenna 106. The GPS antenna may be used to receive information from GPS satellites without the ability to transmit data.

The satellite antenna 105 may be configured to be controlled by the controller 107 (e.g., via, for example, a separate satellite communication interface 108 or a separate satellite communication interface and controller) to communicate with an electronic device, such as, one or more satellite electronic devices, wherein communicate means performing at least one of the followings: transmitting data to or receiving data from.

As shown in FIG. 1, the data recording apparatus 100 may include a wireless charging interface 103 and a wireless communication interface 104, which, because the data recording apparatus 100 may be wireless, ensures quick detachment of the data recording apparatus 100 from the airplane 300, when a crash of the airplane 300 occurs.

The data recording apparatus 100 may include touch-less signal/data and power connections that are provided via the wireless charging interface 103 and wireless communication interface 104. For example, the wireless communication interface 104 may include antennas that are configured to provide communication between the data recording apparatus 100 and FDAU. The communication may be any type of wireless protocol known now or in the future, such as, Wi-Fi, short range wireless protocol, Bluetooth, near-field communication (NFC), to avoid a wired cable connection. The wireless antennas may be located at the bottom of the data recording apparatus.

In this regard, the data recording apparatus may constantly communicate with FDAU. The data recording apparatus may record flight data and multimedia data from cockpit, passenger and cargo cabins.

The wireless charging interface may comprise one or more power ports (sensing areas). For example, according to an embodiment, two touch-less power ports (sensing areas) under the data recording apparatus may be provided. The one or more power ports may be powered by the airplane via wireless charging interfaces.

The touch-less connection ensures clean breakaway when crash happens. Also, it eliminates weak points on the main body of the data recording apparatus, which can introduce damage.

The controller 107 may be configured to store, in the memory 110, data sent through the satellite antenna 108 and data received through the GPS antenna 106. The controller may be configured to store, in the memory 110, data received from the wireless communication interface 104.

The data recording apparatus 100 may further include a beacon, such as, an emergency beacon 101. The emergency beacon 101 may be provided on an outer surface (top surface) of a main body portion of the data recording apparatus 100 (see, for example, FIG. 2A discussed below).

The components shown in FIG. 1 for data recording apparatus 100 are exemplary in nature and are not intended to suggest any limitation as to the scope of the data recording apparatus 100.

The SSD (memory) of the data recording apparatus could be connected to a memory reader to read the encrypted data. The memory reader may be or may be connected to a display or display device (e.g., a mobile phone, computer, or a haptic feedback display touch screen device). The display (sometimes referred to as a display screen) may include any type of display screen, such as, a touch screen display, an OLED screen, an LCD screen, a CRT screen, glasses and printers.

The controller 107 may be connected to each of the other components of FIG. 1.

According to an embodiment, the data recording apparatus 100 may comprise a housing. Embodiments of the data recording apparatus 100, including the housing, are shown in, for example, FIGS. 2A-2E. For example, the controller 107 and the memory 110 may be housed inside of the housing. Outer surface views of the housing, according to one or more embodiments of the disclosure, are illustrated in FIGS. 2A-2E.

Figure 2A:
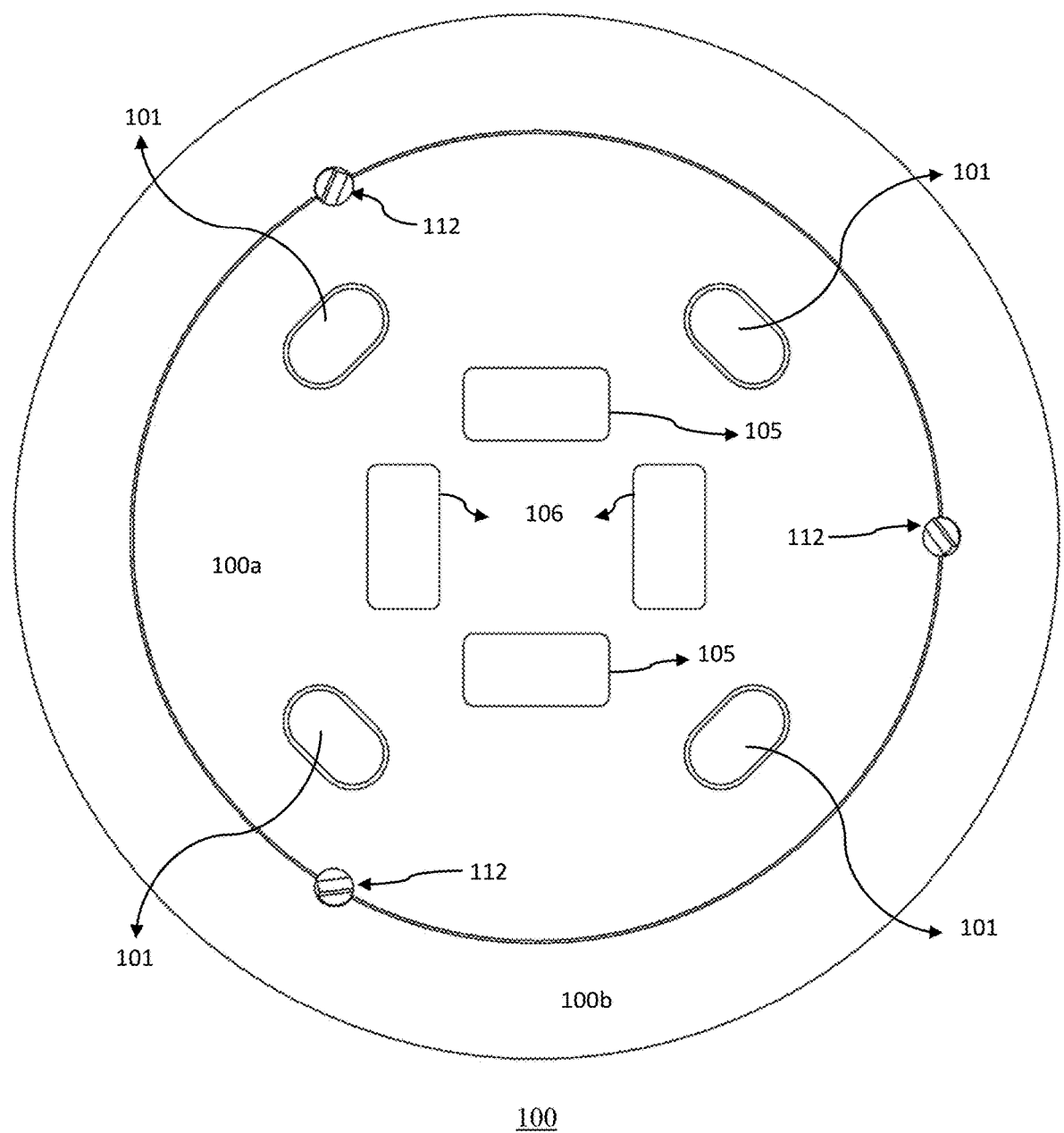
FIG. 2A shows a top view illustration of a data recording apparatus in accordance with an embodiment of the disclosure.

For example, according to an embodiment of the disclosure, a top view of the housing of the data recording apparatus 100 is illustrated in FIG. 2A. As shown in FIG. 2A, the housing may be configured to include at least a portion of the one or more antennas on the top of the housing. In an embodiment, as shown in FIG. 2A, the data recording apparatus 100 may include a lid 100a of the data recording apparatus 100 (shown in FIG. 2A) that includes one or more (two are shown) areas for GPS antenna(s) 106 of the data recording apparatus 100. The lid 100a may be threaded on a lower portion so as to screw into the main body portion 100b of the data recording apparatus 100.

The GPS antenna 106 may include a GPS antenna window in the lid 100a. The lid 100a may be made of titanium alloy. The beacon windows 101 may be in an oval shape.

As shown in FIG. 2A, screws 112 may be used to secure the lid 100a to the main body portion 100b, after the lid 100a itself is screwed into the main body portion 100b. That is, the lid 100a and the main body portion 100b may be threaded so as to be screwed together. The screws 112 may be used so that the lid 100a does not accidently unscrew itself during flight due to the vibration. However, the securing means of securing the lid 100a with the main body portion 100b are not limited to screwing the thread, and any suitable securing means known now or in the future may be used.

The lid 100a may further comprise one or more areas for satellite antennas 105 provided on the surface of the lid 100a.

In an embodiment of the disclosure, securing means (shown as screws 112) may be provided that may maintain the lid 100a in place (i.e., screwed in) with the main body portion 100b of the data recording apparatus 100. However, other suitable attachment means as known in the art may be used. In an embodiment, the securing means may not be used.

Data Recording Apparatus Shape

Figure 2B:
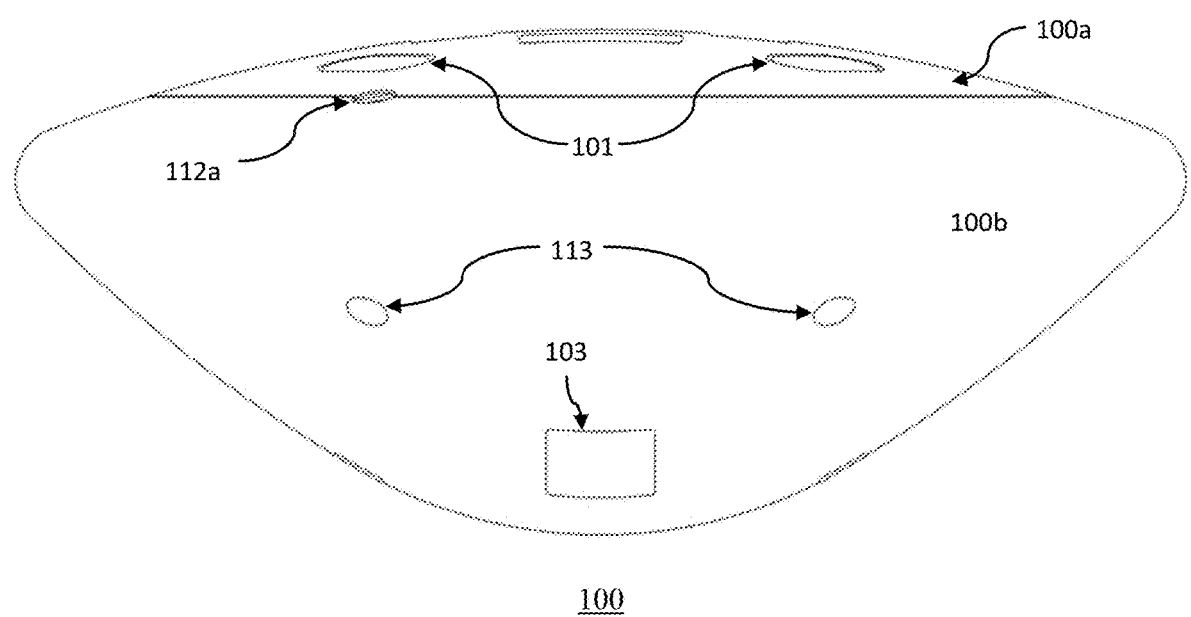
FIG. 2B shows a front (or back) view illustration of a data recording apparatus in accordance with an embodiment of the disclosure.
Figure 2C:
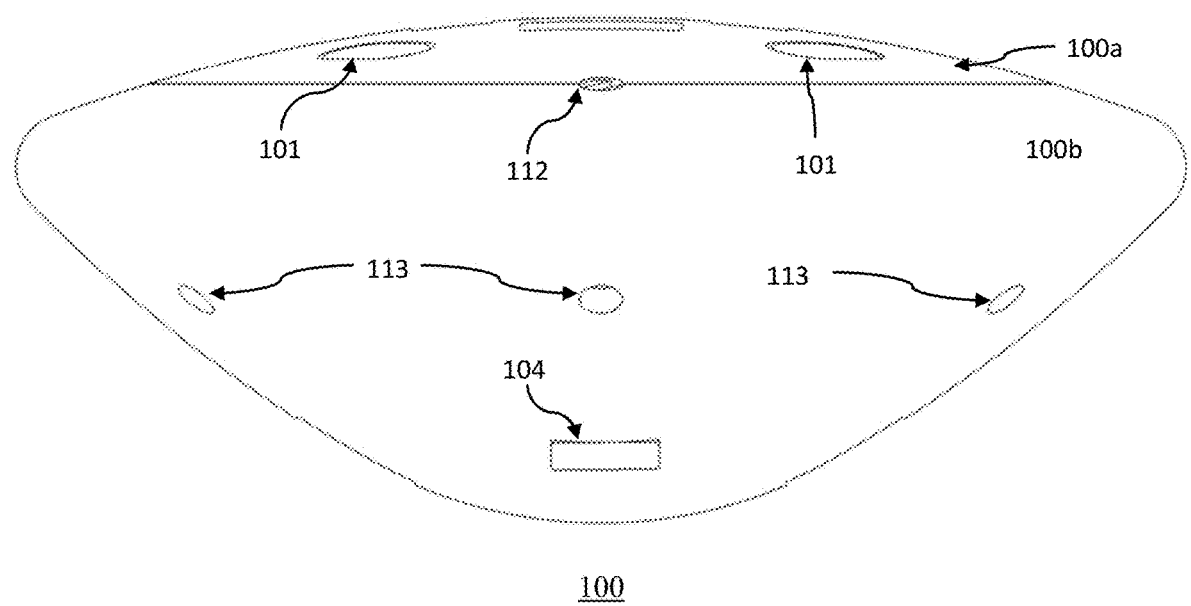
FIG. 2C shows a side view illustration of a data recording apparatus in accordance with an embodiment of the disclosure.

In an embodiment, the data recording apparatus 100 may have a housing including one or more housing portions. For example, as shown in FIGS. 2B and 2C, a lid 100a of the data recording apparatus 100 may have a substantially flatter-curved top surface, such as, compared to a main body portion 100b of the data recording apparatus 100, which may have curves (e.g., steeper curves as shown in FIGS. 2B and 2C). In an embodiment, the data recording apparatus may have no flat surfaces, which ensures that all external forces applied to the data recording apparatus will be deflected when an airplane 300 impact occurs, so as to alleviate pressure on the data recording apparatus 100. The data recording apparatus will be forced out of the way. In an embodiment, the main body portion 100b may have an outer surface shape that is the same as or similar to a hemisphere. In an embodiment, the main body portion 100b may have a curvature shape.

The housing of the data recording apparatus 100 (e.g., the housing of the lid 100a and the housing of the main body portion 100b) may be made of a strong material. For example, the data recording apparatus 100 may be constructed of titanium alloy, which is lightweight yet strong.

FIG. 2B shows a front (or back) view illustration of a data recording apparatus 100 in accordance with an embodiment of the disclosure. FIG. 2B shows similar features as in FIGS. 1 and 2A, which are not repeated here. FIG. 2B also shows mounting bolt holes 113 that may be used, in conjunction with a mounting bolt (discussed below), to mount/connect the main body portion 100b with a data recording apparatus mounting well (discussed below). FIG. 2B also shows wireless charging interface 103 provided on main body portion 100b.

Although FIG. 2B only shows two bolt holes 113 (from this perspective), more bolt holes 113 may be provided that are out of view. The FIGS. show an embodiment with six bolt holes 113, but a different number (e.g., 3 or more) may be used.

FIG. 2C shows a side view illustration of a data recording apparatus in accordance with an embodiment of the disclosure. FIG. 2C shows similar features as in FIGS. 1, 2A and 2B, which are not repeated here. FIG. 2C also shows wireless communication interface 104. FIG. 2C shows two additional bolt holes 113.

Figure 2D:
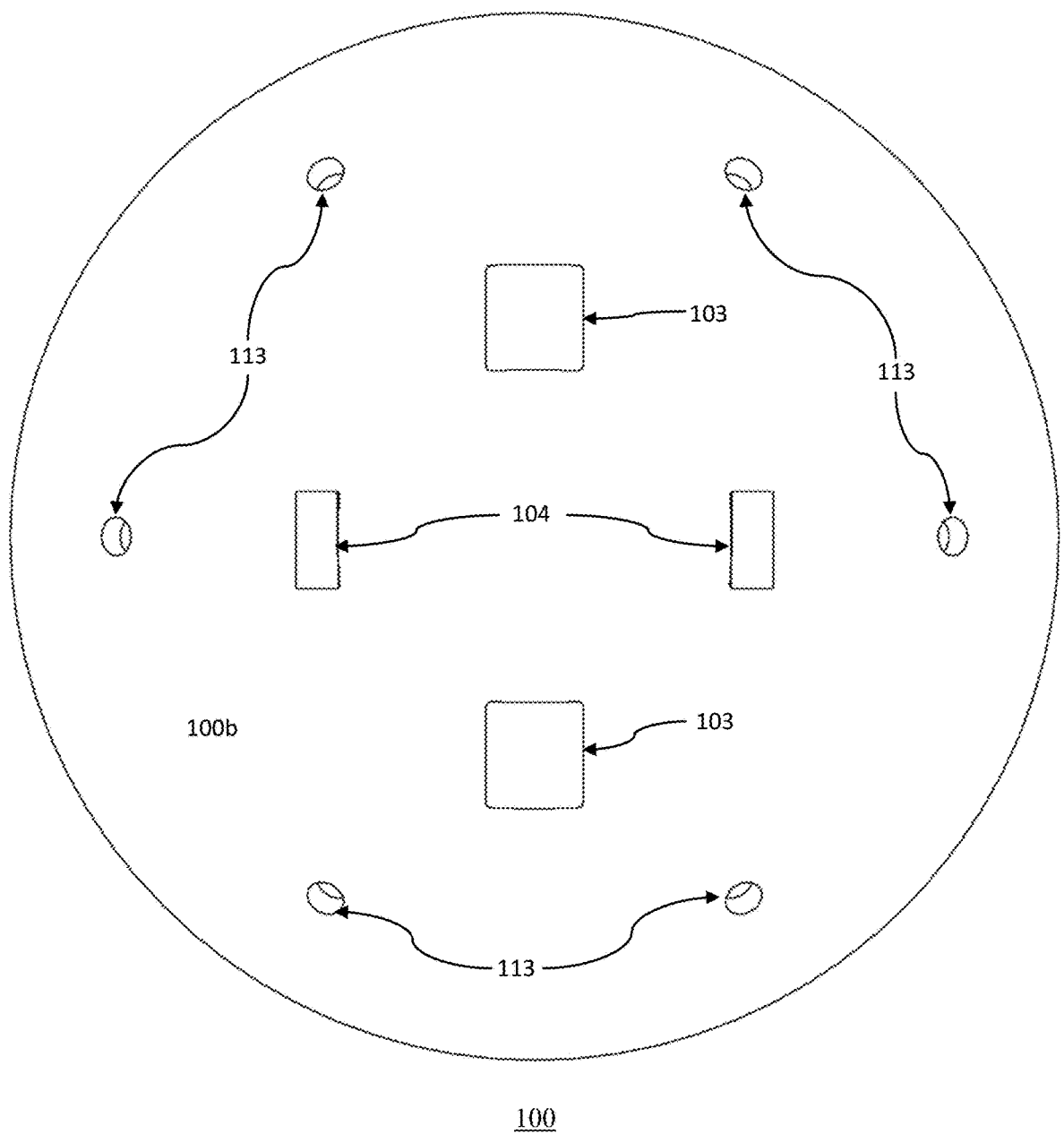
FIG. 2D shows a bottom view illustration of a data recording apparatus in accordance with an embodiment of the disclosure.

FIG. 2D shows a bottom view illustration of a data recording apparatus in accordance with an embodiment of the disclosure. In particular, FIG. 2D shows the entire outer surface of main body portion 100b. The main body portion 100b may be a hemispherical or semi-hemispherical shape (or dome-shaped). FIG. 2D shows similar features as in FIGS. 1, and 2A-2C, which are not repeated here.

Figure 2E:
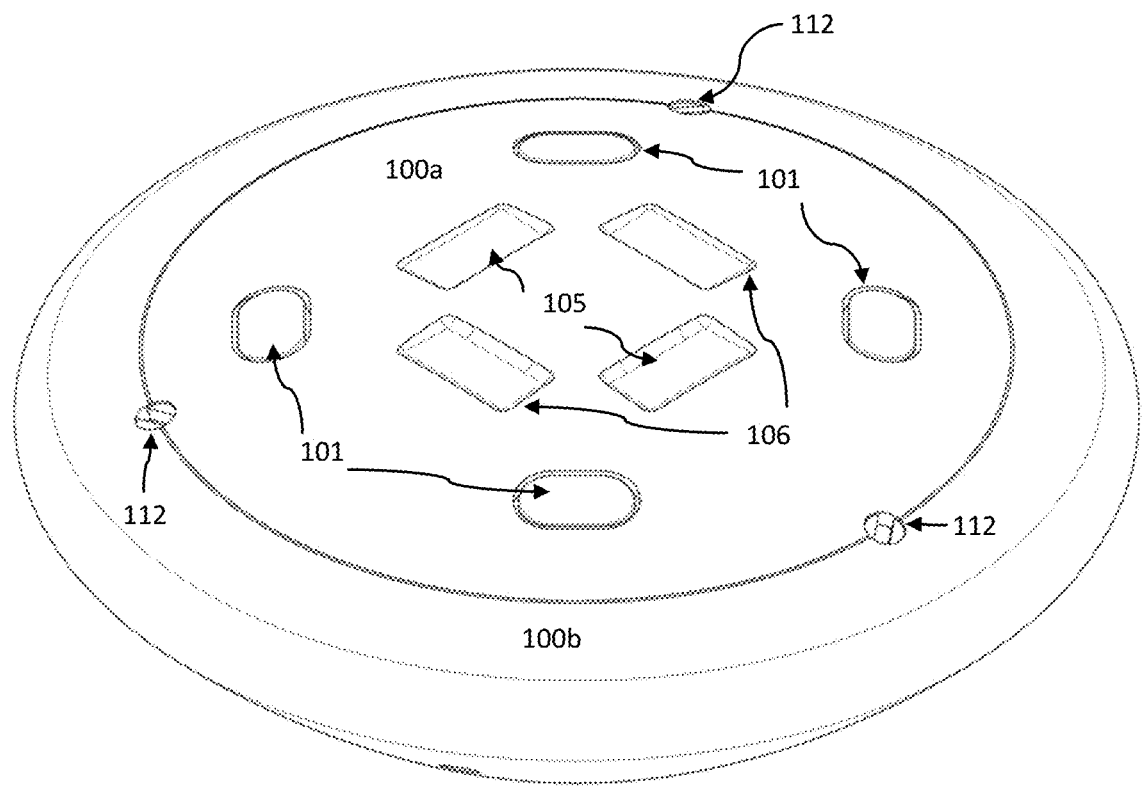
FIG. 2E shows a perspective view illustration of a data recording apparatus in accordance with an embodiment of the disclosure.

FIG. 2E shows a perspective view illustration of a data recording apparatus in accordance with an embodiment of the disclosure. FIG. 2E shows similar features as in FIGS. 1, and 2A-2D, which are not repeated here.

Buoyant Design of Data Recording Apparatus

According to an embodiment of the disclosure, the shape, material and unit design of the data recording apparatus and its housing may be configured to support self-floating of the data recording apparatus. For example, the weight of the data recording apparatus 100, including that of the components (e.g., the electronics inside or provided on the outer surfaces of the housing of the data recording apparatus 100) and the lid and main body portion, can be such that the data recording apparatus 100 stays afloat (by being supported by buoyant force) when the data recording apparatus drops into water. The data recording apparatus 100 may have a lid and main body portion that are designed to be watertight such that the data recording apparatus 100 still works even if the data recording apparatus lands in water.

Unit Design

Based on knowing the density of the housing material of the data recording apparatus 100 and the weight of the other components of the data recording apparatus 100, the data recording apparatus may be designed with the housing being a proper size and wall thickness to support itself so as to float in water based on its displacement.

For example, the average density of titanium alloy is 4.5 g/cm³. Thus, for the titanium alloy material, the buoyant force may be calculated as V*D*g, where V is the displacement of the fluid, D is the density of the fluid and g is the gravitational constant. In this application, the fluid is fresh water or sea water. The density difference between fresh water and sea (salt) water is neglectable.

In an embodiment, to support the weight of the data recording apparatus (or IFIU), the required buoyant force should be the same as or larger than that of water.

Exemplary formulas (1)-(3) for finding a weight that provides the self-floating feature (buoyant force) is provided below.

$$\text{Weight}_{IFIU} = V_{Ti\ of\ IFIU} * D_{Ti} * g \quad \text{Formula (1)}$$

Where $V_{Ti\ of\ IFIU}$ is the volume of data recording apparatus titanium material, $D_{Ti}$ is the density of titanium alloy, g is gravitational constant.

$$\text{Buoyant force} = V_{IFIU} * D_{water} * g \quad \text{Formula (2)}$$

Where $V_{IFIU}$ is the volume of the data recording apparatus, $D_{water}$ is the density of water, g is gravitational constant.

$$\text{Buoyant force} \geq \text{Weight}_{IFIU} \quad \text{Formula (3)}$$

For example, because the density of titanium is 4.5 times of that of water, the target volume of the IFIU in this embodiment needs to be 4.5 times of the solid titanium alloy with the same weight. So, $V_{Ti\ of\ IFIU}:V_{IFIU}=1:4.5$ The minimal required interior cavity volume to that of entire IFIU ratio is (4.5-1):4.5=77%. That means that, if the weight of electronic components is not considered, at least 77% of the internal volume of the data recording apparatus should be hollow to create enough buoyant force to support its own weight. This can be achieved as soon as a size of the data recording apparatus is decided. In addition, internal electronic components could be taken into consideration at that time.

The shape design, material selection and weight calculation of the data recording apparatus and housing may be intended to achieve the goal that the data mounting recording apparatus 100 can float on the surface of water by buoyant force (e.g., after the data recording apparatus breaks away from the airplane 300).

Figure 3A:
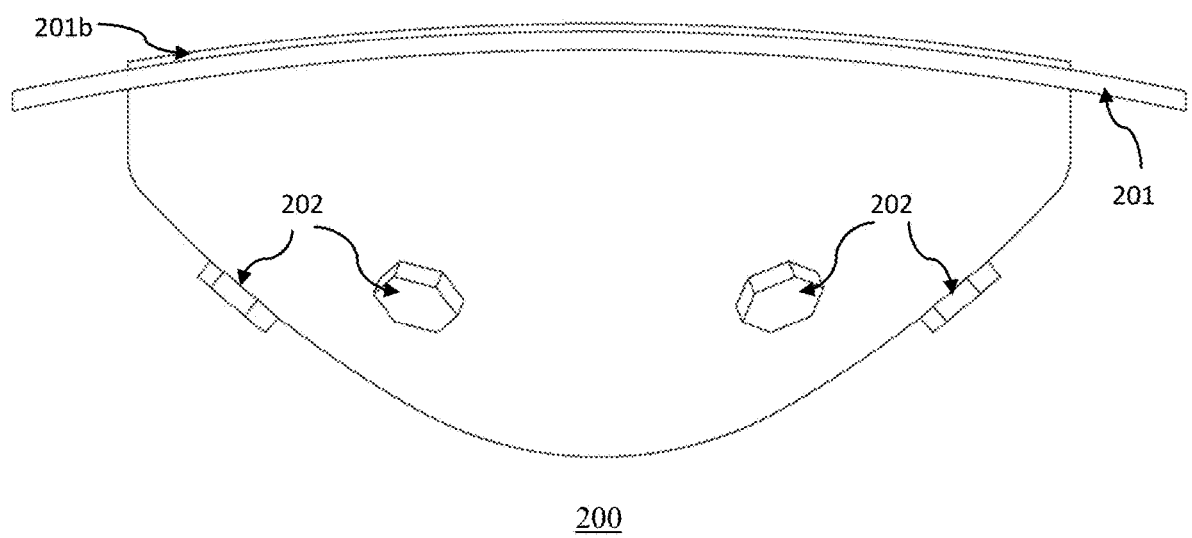
FIG. 3A shows a front view of a data recording apparatus mounting well, including showing mounting bolts for mounting a data recording apparatus in accordance with an embodiment.

FIG. 3A shows a front view of a data recording apparatus mounting well 200, including showing mounting bolts 202 for mounting a data recording apparatus in accordance with an embodiment. In an embodiment, the mounting bolts 202 may be inserted into through holes (e.g., bolt screw holes) provided in the mounting well 200 such that the mounting bolts attach the data recording apparatus 100 to the mounting well 200 via bolt holes 113 provided in the main body portion 100b of the data recording apparatus 100. A rim 201b may be provided on an inner side of a well mounting flange 201 provided on an upper portion of the mounting well 200. The rim 201b may be raised a little from the mounting flange 201 to protect a cover (e.g., a glass cover) that rests within the circumference of the rim 201b.

The mounting well 200 may have an upper portion that is curved (and curved glass) so as to follow a curve of the fuselage on the top of the airplane.

Figure 3B:
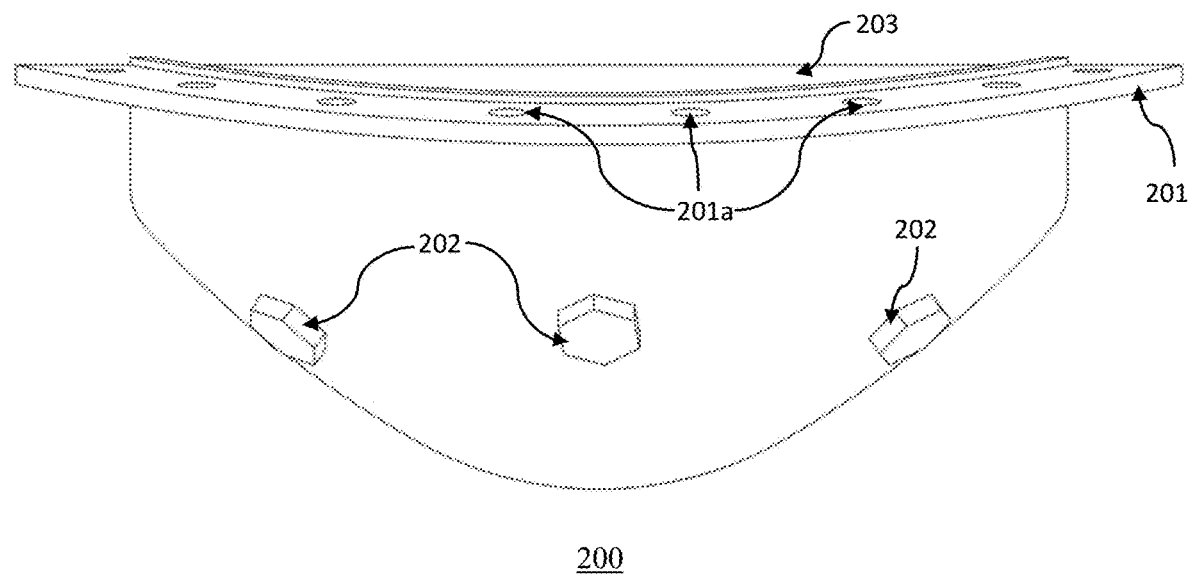
FIG. 3B shows a side view of a data recording apparatus mounting well, including showing mounting bolts for mounting a data recording apparatus in accordance with an embodiment.

As shown in FIG. 3B, the mounting well 200 may be attached to the airplane 300 via though holes 201a provided in the well mounting flange 201. The attachment means are shown as through holes 201a in which well mounting bolts (not shown) may be bolted through so as to mount (attach) the mounting well 200 to the airplane 300. However, other known now or in the future attachment means may be used. The well mounting flange 201 may be mounted on a reinforced frame on the airplane 300. The attachment means may include bolts that attach the mounting well 200 to the airplane 300. However, other suitable attachment means known now or in the future may be used.

The mounting bolts 202 are discussed more below. The data recording apparatus mounting well 200 may have an inner shape that is also dome-shaped (e.g., roughly dome-shaped) so as to follow the contour of the main body portion 100b of the data recording apparatus 100. The outer shape of the mounting well 200 may be similar to or different from the inner shape of the mounting well 200. The mounting well 200 may be constructed by a high strength material, such as, a reinforced material, such as, steel or titanium alloy. However, other materials known now or in the future may be used for the mounting well. A well mounting flange 201 of the mounting well 200 may be bolted to a roof of the airplane 300. The data recording apparatus mounting well 200 may be covered by a protective cover 203, which may be transparent or opaque. In this regard, the protective cover may be a plexiglass material, such as polycarbonate.

FIG. 3B shows aside view of a data recording apparatus mounting well 200, including showing mounting bolts 202, for mounting a data recording apparatus 100 in accordance with an embodiment. FIG. 3B shows similar features as in FIG. 3A, which are not repeated here. FIG. 3B shows through holes 201a provided in the well mounting flange 201 of the mounting well 200 and protective cover 203. Well mounting bolts (not shown) may be bolted through holes 201a to mount the mounting well 200 to the airplane 300.

Figure 3C:
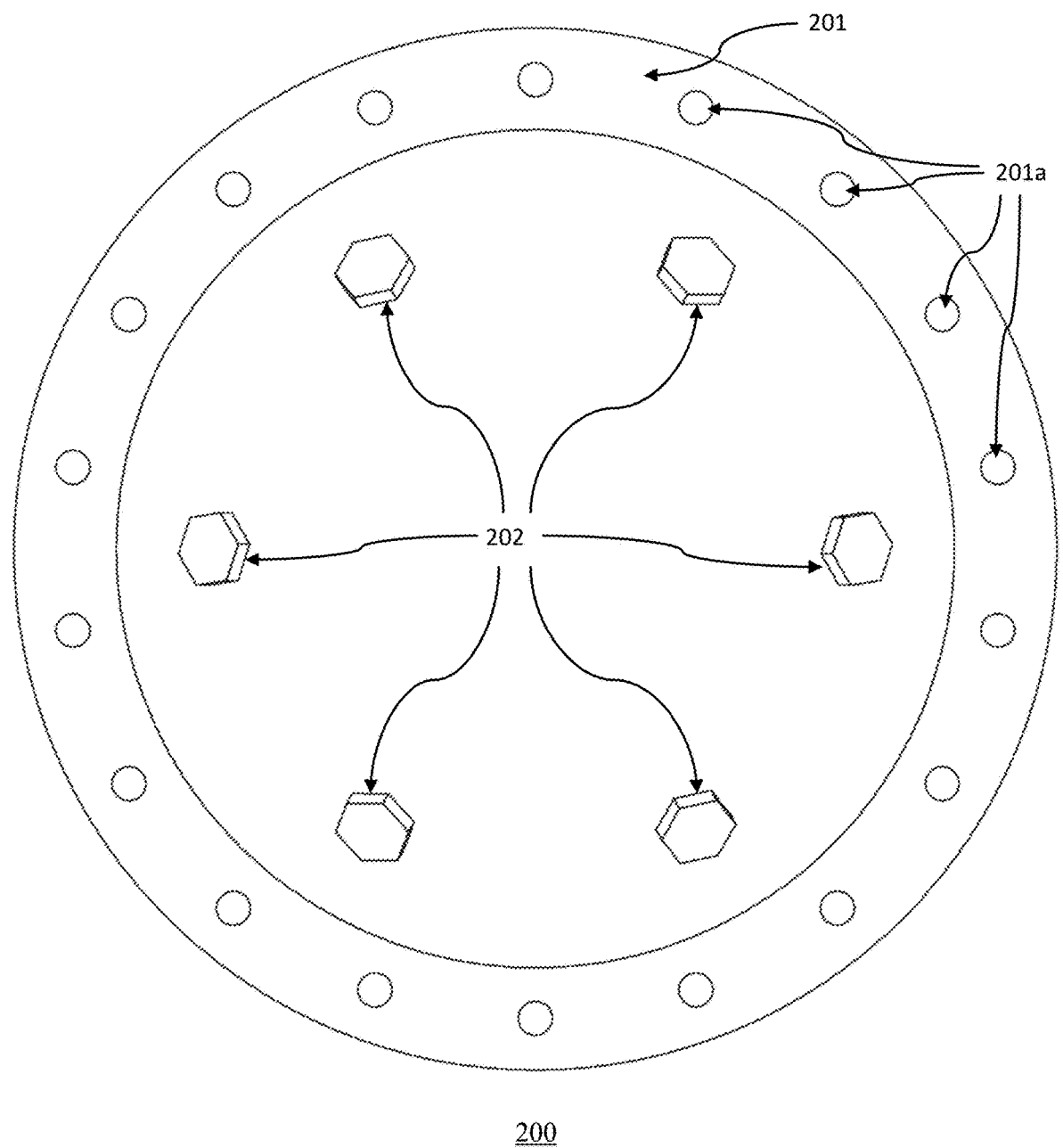
FIG. 3C shows a bottom view of a data recording apparatus mounting well, including showing mounting bolts for mounting a data recording apparatus in accordance with an embodiment.

FIG. 3C shows a bottom view of a data recording apparatus mounting well, including showing mounting bolts 202, for mounting a data recording apparatus in accordance with an embodiment. FIG. 3C shows similar features as in FIGS. 3A and 3B, which are not repeated here. Similar features, as used in the specification, may include the same features.

Figure 3D:
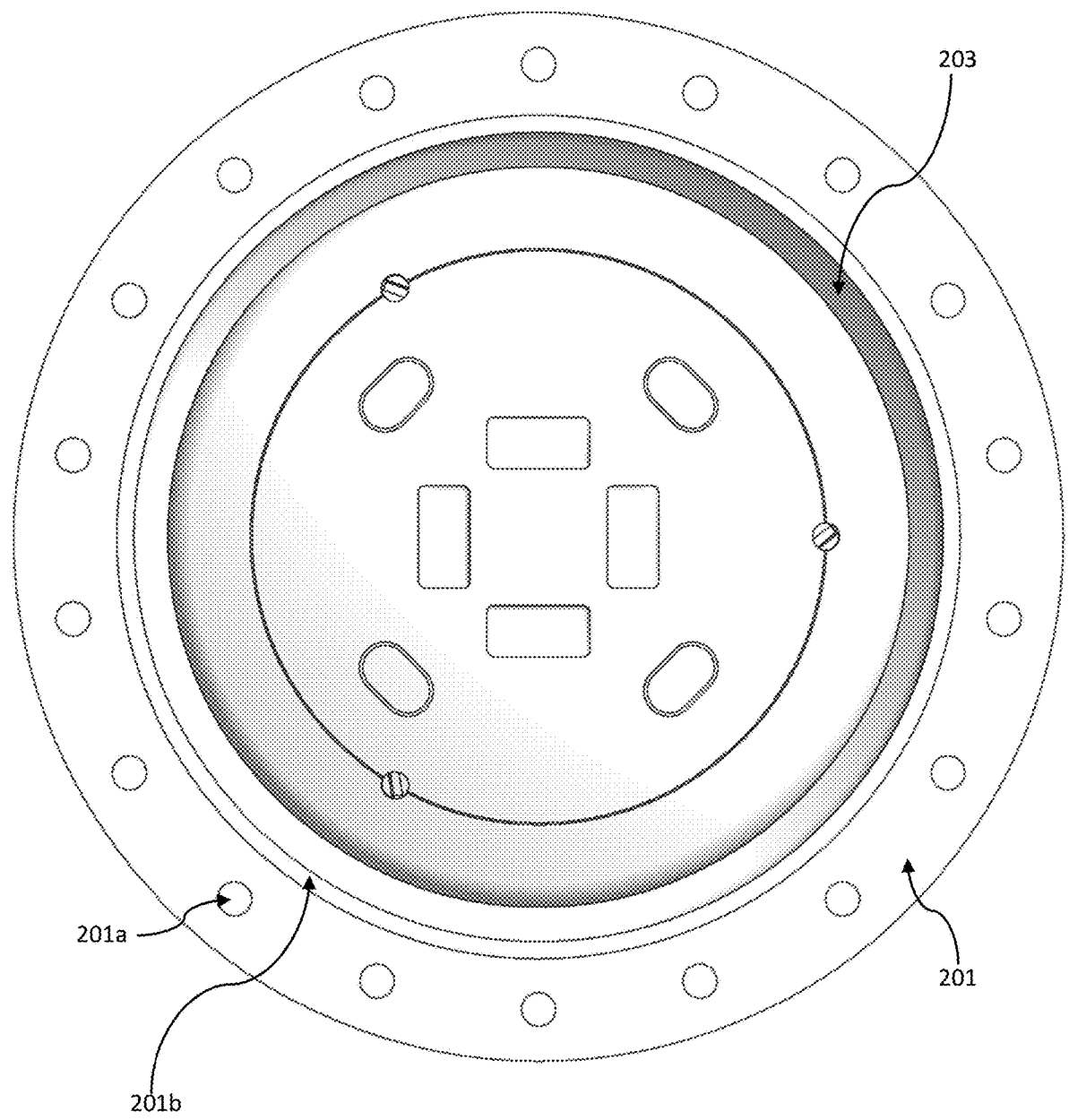
FIG. 3D shows a top view of a data recording apparatus mounting well, including a data recording apparatus, with a top window, in accordance with an embodiment.

FIG. 3D is atop view of the data recording apparatus 100 sitting in a holding well 200 with a top window/protective cover 203 provided that rests on an rim 201b provided on an inner side of the mounting flange 201. FIG. 3D shows similar features as in FIGS. 3A-3C, which are not repeated here. As shown in FIG. 3D, where the mounting flange 201 connects with the mounting well 200, a rim 201b may be provided such that a protective cover 203 may be protected from the outside.

Figure 3E:
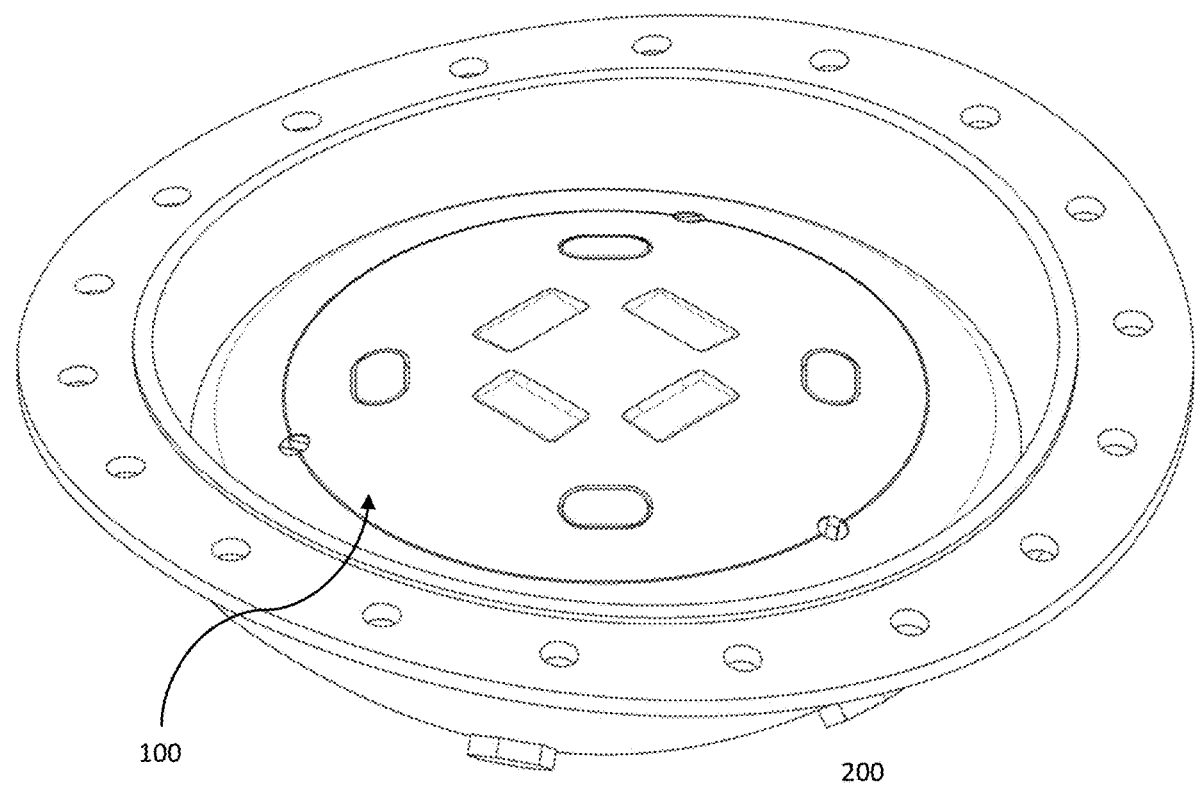
FIG. 3E shows a perspective view of a data recording apparatus well, including a data recording apparatus, with a top window, in accordance with an embodiment.

FIG. 3E shows a perspective view of a data recording apparatus mounting well, including a data recording apparatus, with a top window/protective cover 203, in accordance with an embodiment. FIG. 3E shows similar features as in FIGS. 3A-3D, which are not repeated here. FIG. 3D shows a view where a protective cover 203, which may be transparent (shown here), semi-transparent or opaque, may be provided. The protective cover 203 may have a circumference that is the same as the circumference of the inner rim 201b of the mounting flange 201.

Figure 4:
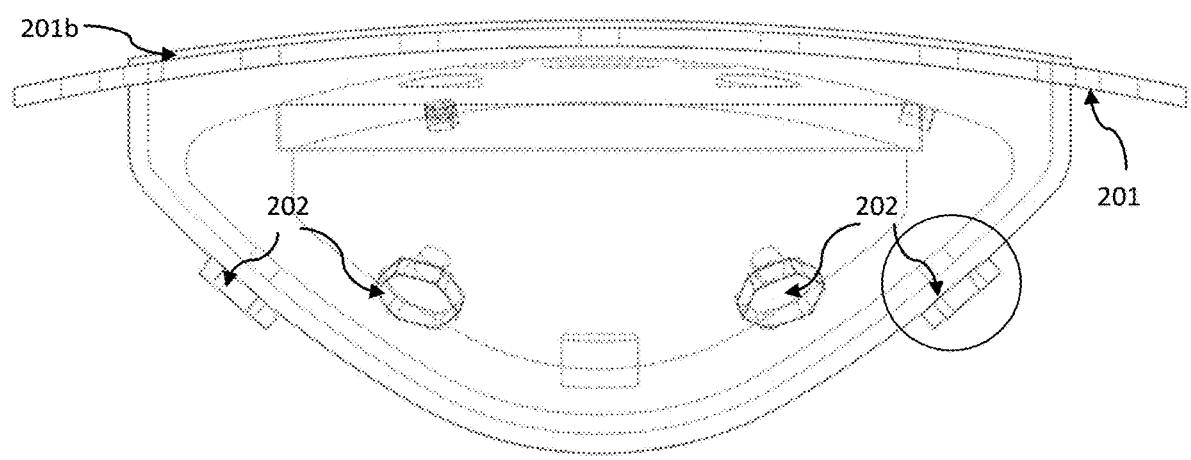
FIG. 4 shows a front transparent view of a data recording apparatus mounting well, including a data recording apparatus and showing mounting bolts for mounting the data recording apparatus mounting in accordance with an embodiment.

FIG. 4 shows a front see-through view of a data recording apparatus mounting well 200, including a data recording apparatus 100 and shows mounting bolts for mounting the data recording apparatus 100 to the mounting well 200, in accordance with an embodiment. FIG. 4 shows similar features as in FIGS. 3A-3E, which are not repeated here. FIG. 4 shows hidden lines for showing how the data recording apparatus 100 may be mounted inside of a mounting well 200, according to an embodiment. The circled portion of FIG. 4 is of a mounting bolt 202, which are discussed below with regards to FIGS. 5A-5C, and shows how a mounting bolt 202 may be used, according to an embodiment.

Figure 5A:
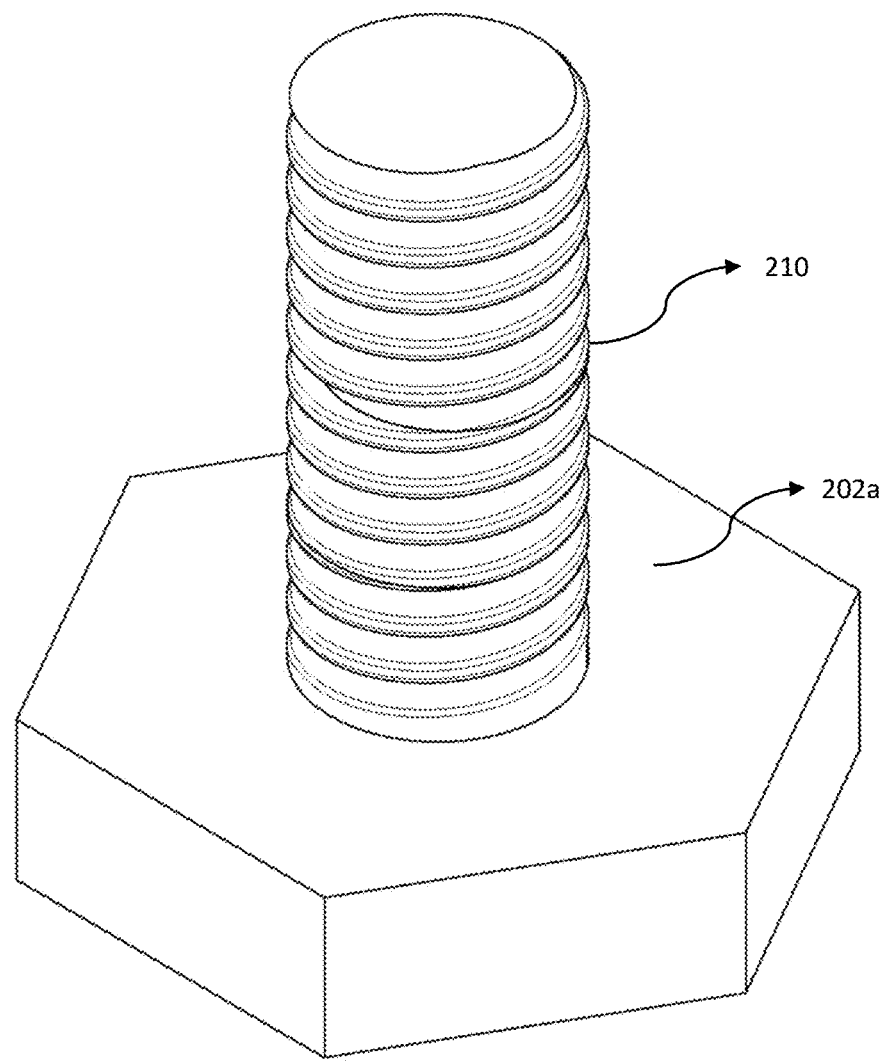
FIG. 5A shows a perspective view of a data recording apparatus mounting bolt, constructed of two different materials, in accordance with an embodiment.
Figure 5B:
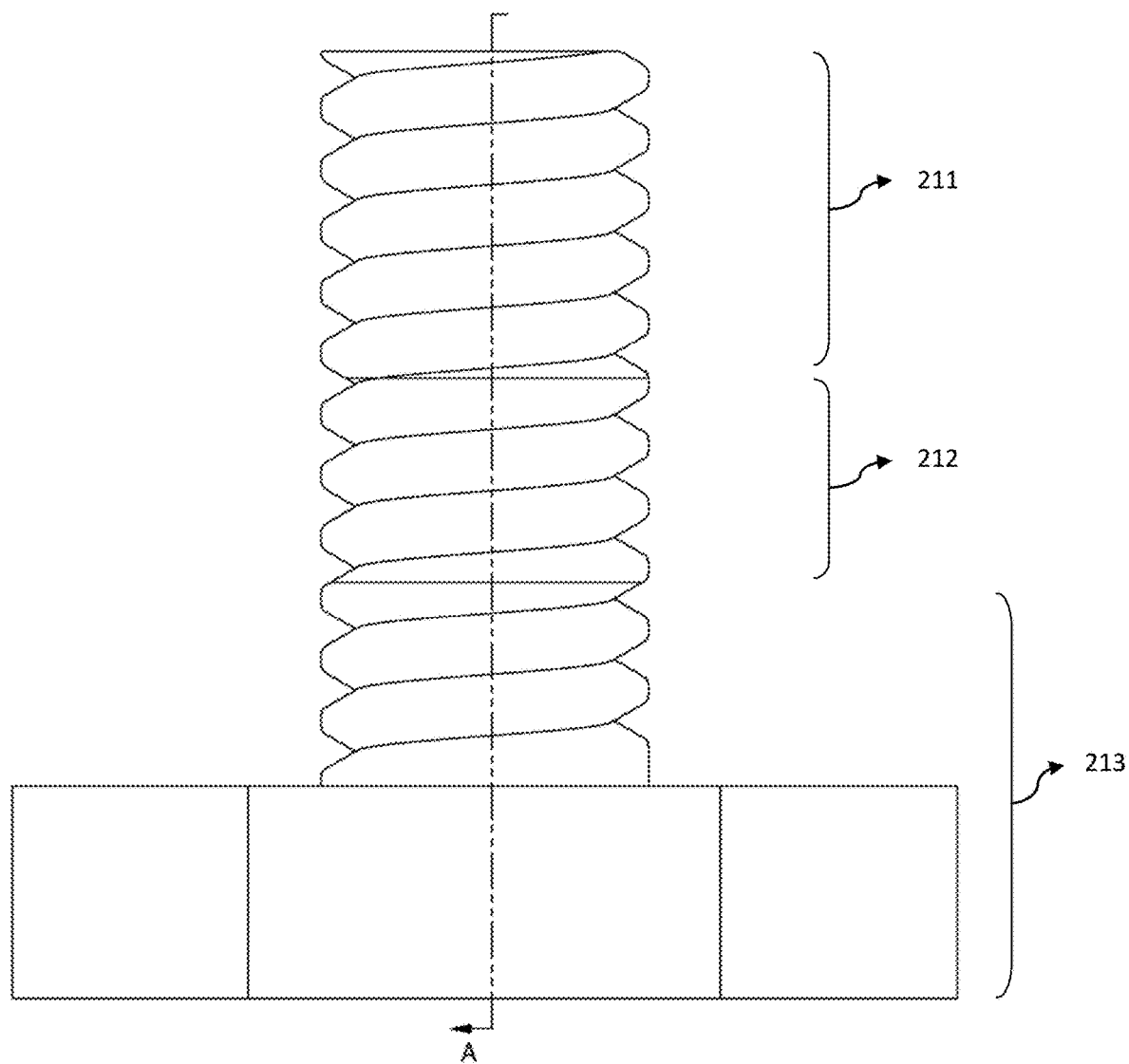
FIG. 5B shows a front view of a data recording apparatus mounting bolt, constructed of two different materials, in accordance with an embodiment.
Figure 5C:
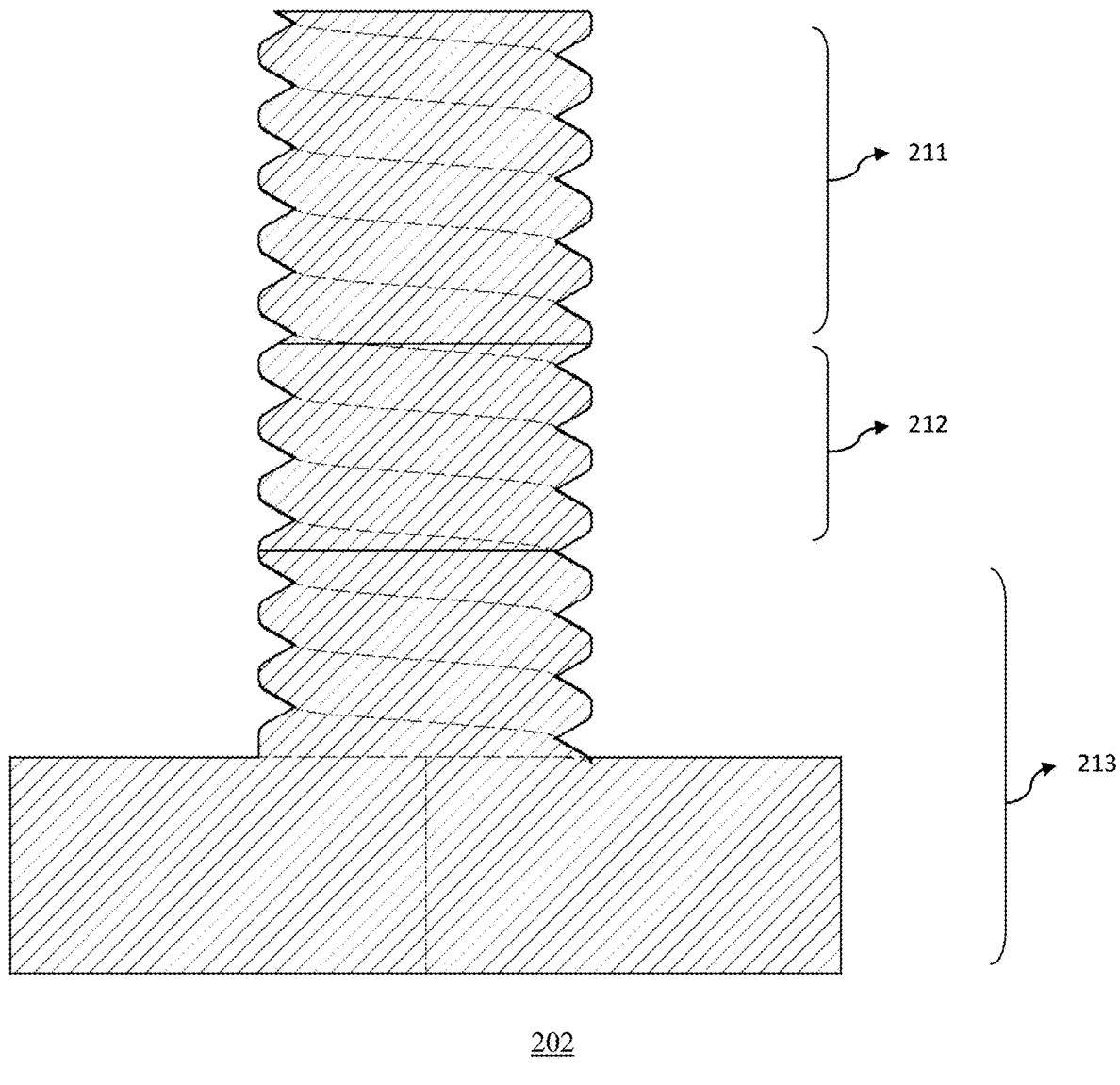
FIG. 5C shows a section view of a data recording apparatus mounting bolt, constructed of two different materials, in accordance with an embodiment.

FIGS. 5A-5C show a mounting bolt 202 according to an embodiment of the disclosure. Three or more mounting bolts may be used, as discussed above.

FIG. 5A shows a perspective view of an embodiment of a mounting bolt 202, constructed of two different materials, in accordance with an embodiment. The mounting bolt 202 may include a bolt head 202a and a shank 210. The shank 210 may be provided in a center of the bolt head 202a. The shank 210 may have different lengths. For example, a first portion 211 of the shank 210 may allow the shank to penetrate the main body portion 100b of the data recording apparatus 100 and attach the data recording apparatus 100 to the mounting well. In an embodiment, the shank 210 may have a second portion 212.

FIG. 5B shows a front view of a data recording apparatus mounting bolt 202, constructed of two different materials, in accordance with an embodiment. FIG. 5B shows similar features as in FIG. 5A, which are not repeated here. FIG. 5B shows three different shank portions 211, 212 and 213 of the mounting bolt 202. As shown in FIG. 5B, the first shank portion 211 and the third portion 213 may be comprised of a first material and the second portion 212 may be comprised of a second material that is different from the first material. The second material may have a lower tensile strength than a tensile strength of the first material. The second material may have a tensile strength that allows the second material to break when the airplane crashes, but to remain intact during takeoff, during flight and during routine landings.

The first portion 211 may comprise a top or front portion of the shank 210. The second portion may comprise a portion of the shank 210 that is located between the first portion 211 and the third portion 213. The third portion may comprise the head of the mounting bolt 202 and the remaining portion of the shank 210 (i.e., the portion supported by the mounting well 200). The first (top or front) portion 211 and the third portion 213 may be screwed into the main body portion 100b of the data recording apparatus 100 and the mounting well 200 to mount the data recording apparatus 100 to the mounting well 200, respectively.

That is, the material selection of the mounting bolt 202 can be varying. According to an embodiment, the rule of the material selection may be that the middle section material (portion 212) should have a different (e.g. lower) tensile strength comparing to the tensile strength of the material of the portions 211 and 213 (i.e., provided at the two ends of the mounting bolt 202). For example, the bolt head section (portion 213) may be screwed into the mounting well and the main body portion of the data recording apparatus 100 can be made of one of titanium alloys. The middle section (portion 212) of the mounting bolt 202 may be constructed by, for example, an aluminum alloy, such as, 6061-T6 aluminum alloy. The titanium alloy and the aluminum alloy can be welded by ultrasonic welding. Ultrasonic welding may be used, which is an industrial technique whereby high-frequency ultrasonic acoustic vibrations are locally applied to work pieces being held together under pressure to create a solid-state weld.

All of the mounting bolts (e.g., all six bolts) may be mounted indifferent directions. Although three different shank portions 211-213 are shown, two different shank portions could be used, or more than three shank portions could be used. That is, the second shank portion 212 may include the head or the first portion may be the different (e.g. lower) tensile strength portion such that the first portion breaks when a crash/accident occurs.

When the accident (crash) occurs, the force from momentum of the data recording apparatus 100 will break all mounting bolts 202 either at the welding points or in the middle portion 212 (e.g., the aluminum alloy section), according to an embodiment.

According to an embodiment, the design principle may be that the middle section of the mounting bolt should be made of a material with significantly different (e.g. lower) tensile strength comparing to that of the other two ends to ensure a break happens when the airplane crashes.

According to an embodiment, the force added to the mounting bolt during normal operation and takeoff/landing is way under its tensile strength limit for each portion of the bolt. The portions comprised of the material with higher tensile strength are threaded in and supported by the data recording apparatus 100 and data recording apparatus mounting well 200, respectively. The portion 212 comprised of the material with different (e.g. lower) tensile strength, which may be in the middle of the shank 210 of the mounting bolt 202 is not supported due to the gap between the data recording apparatus and data recording apparatus mounting well. Two welding points and a midpoint of the middle section (i.e., second portion 212) may be the potential break points when a crash happens. Because both the data recording apparatus 100 and data recording apparatus mounting well 200 are made of strong materials, the data recording apparatus 100 will break through of the top window/protective cover 203 and be thrown out (separated) from the airplane 300, when a crash occurs.

The total strength of the mounting bolts 202 can be experimented within conjunction with the angles of the installation and the size (e.g., diameters) of the mounting bolts 202.

As an example, according to an embodiment, a widely available titanium alloy is Beta C, which may be used as the stronger (higher tensile strength) material, and has a typical tensile strength of 1,400 MPa (2000,000 psi). 6061-T6 aluminum alloy has tensile strength of 290 MPa (42,000 psi). The tensile strength of ultrasonic welding of aluminum and steel is reported under 100 MPa.

FIG. 5C shows a section view of a mounting bolt 202, constructed of two different materials, in accordance with an embodiment. FIG. 5C shows similar features as in FIGS. 5A and 5B, which are not repeated here.

Figure 6A:
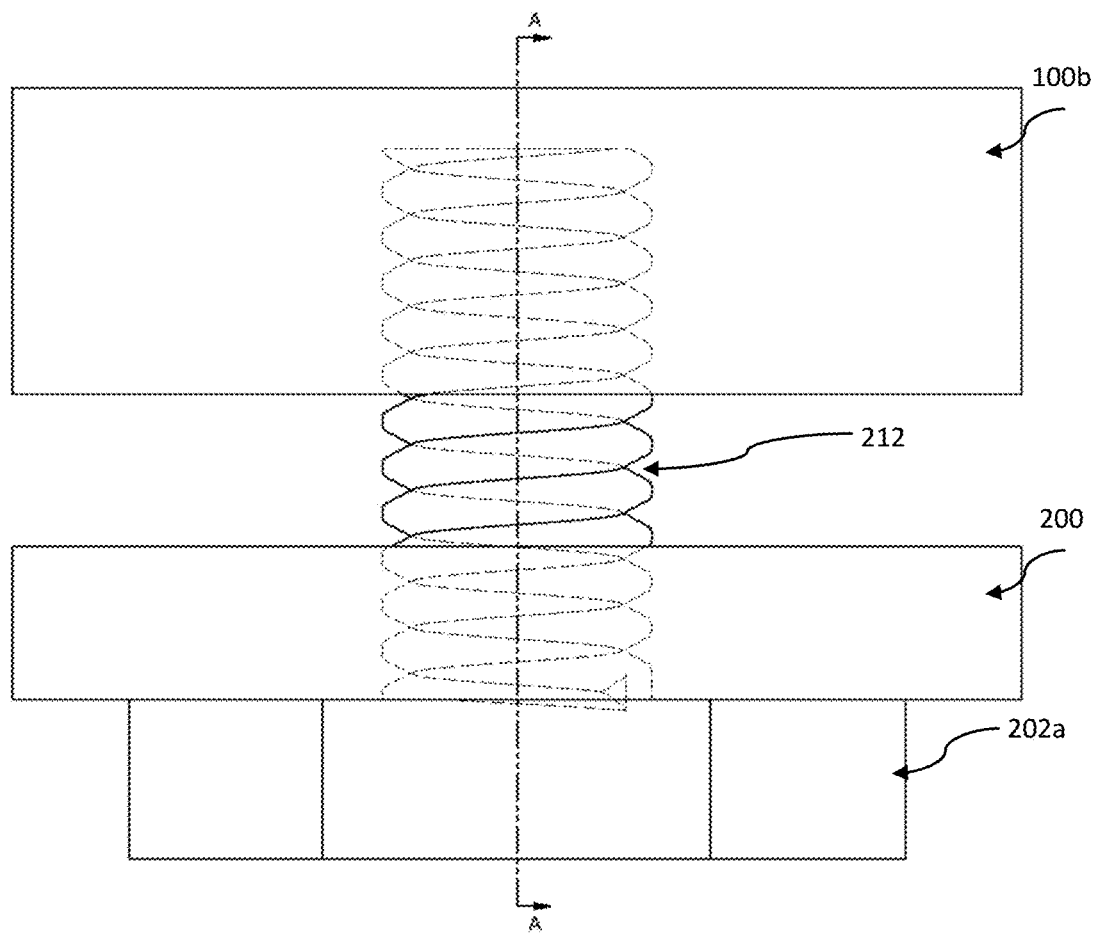
FIG. 6A shows a front view of a data recording apparatus mounting bolt, constructed of two different materials, as installed to attach a data recording apparatus to a portion of the data recording apparatus mounting well, in accordance with an embodiment.

FIG. 6A shows a front view of a mounting bolt 202, constructed of two different materials, as installed to attach a main body portion 100b of a data recording apparatus 100 to a data recording apparatus mounting well 200, in accordance with an embodiment.

Figure 6B:
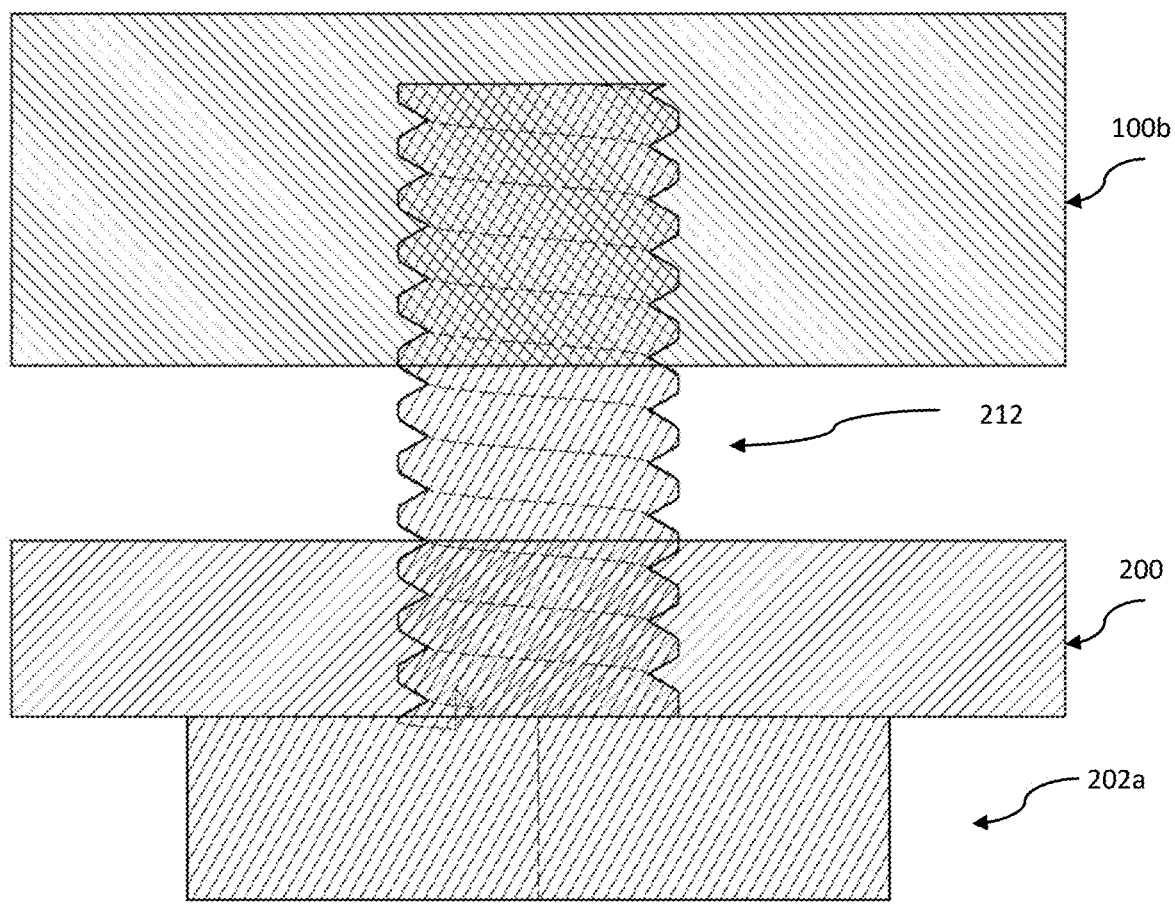
FIG. 6B shows a section view of a data recording apparatus mounting bolt, constructed of two different materials, as installed to attach a data recording apparatus to a portion of the data recording apparatus mounting well, in accordance with an embodiment.

FIG. 6B shows a section view of a data recording apparatus mounting bolt 202, constructed of two different materials, as installed to attach a data recording apparatus 100 to a data recording apparatus mounting well 200, in accordance with an embodiment. FIG. 6B shows similar features as in FIG. 6A, which are not repeated here.

Figure 6C:
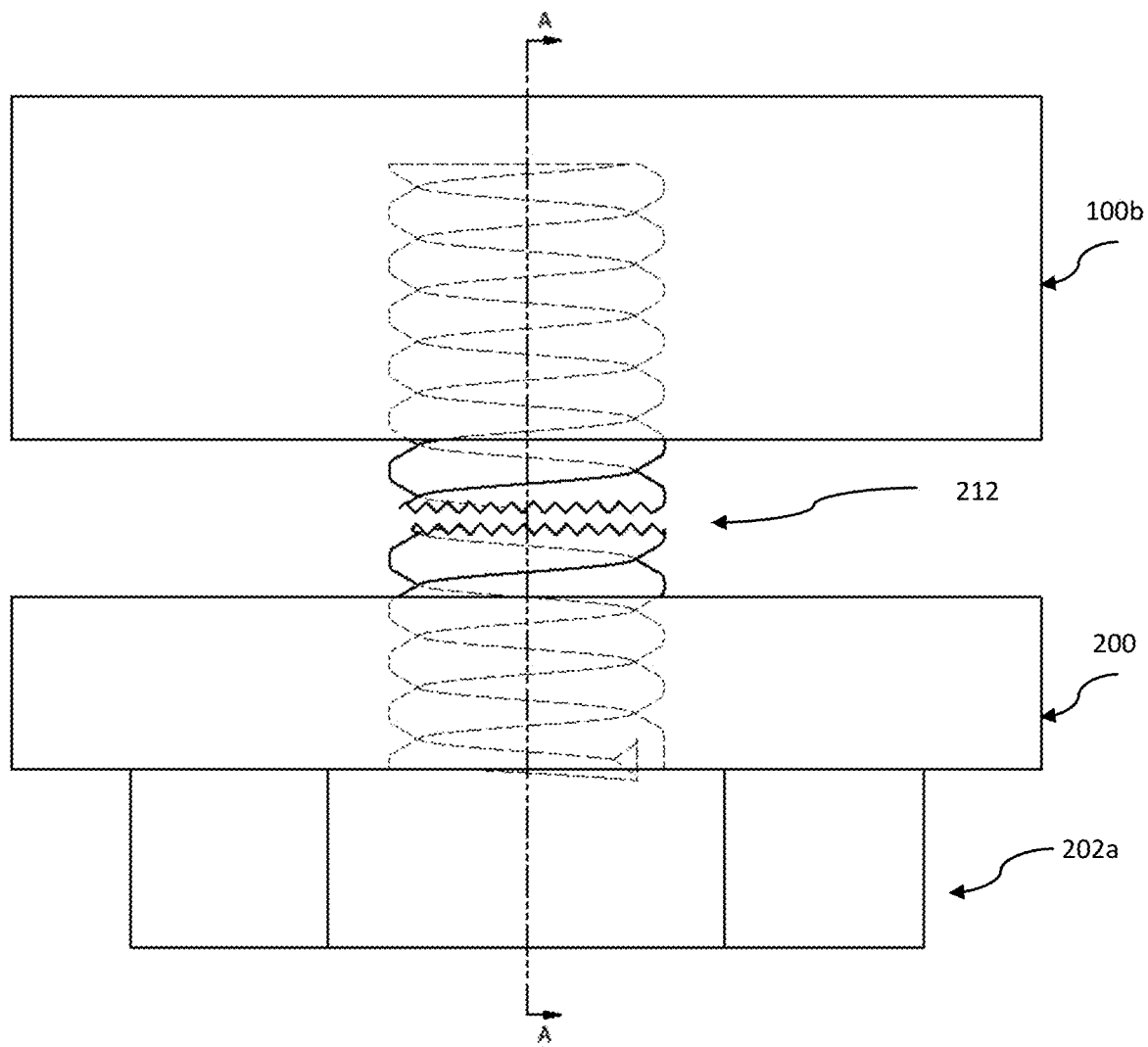
FIG. 6C shows a front view of a data recording apparatus mounting bolt, constructed of two different materials, after the mounting bolt has broken, in accordance with an embodiment.

FIG. 6C shows a front view of a data recording apparatus mounting bolt 202, constructed of two different materials, as installed to attach a data recording apparatus 100 to a data recording apparatus holding well 200, after the mounting bolt 202 is broken in the second portion 212 of the shank 210, in accordance with an embodiment. FIG. 6C shows similar features as in FIGS. 6A and 6B, which are not repeated here. In an embodiment, the mounting bolt 202 is broken along the shank 210 where the second portion 112 is located, but the breakable portion 212 may be located at a position that is different from the middle. The second portion 212 is breakable because the second portion 112 has a tensile strength that is different (e.g. less) than the tensile strength of the first material and this portion is not supported. Also, the breakage may happen at the welding points, which has lower tensile strength comparing to those of other portions (e.g. 211, 212 and 213). That is, at least one a portion of the mounting bolt 202 may have varying tensile strength. Of course, other embodiments could be used as long as the data recording apparatus 100 detaches upon impact. For example, one material (e.g., the second material) could be used for the entire bolt or only two portions (e.g., the first portion and the second portion could be used, in an embodiment of the disclosure.

Figure 6D:
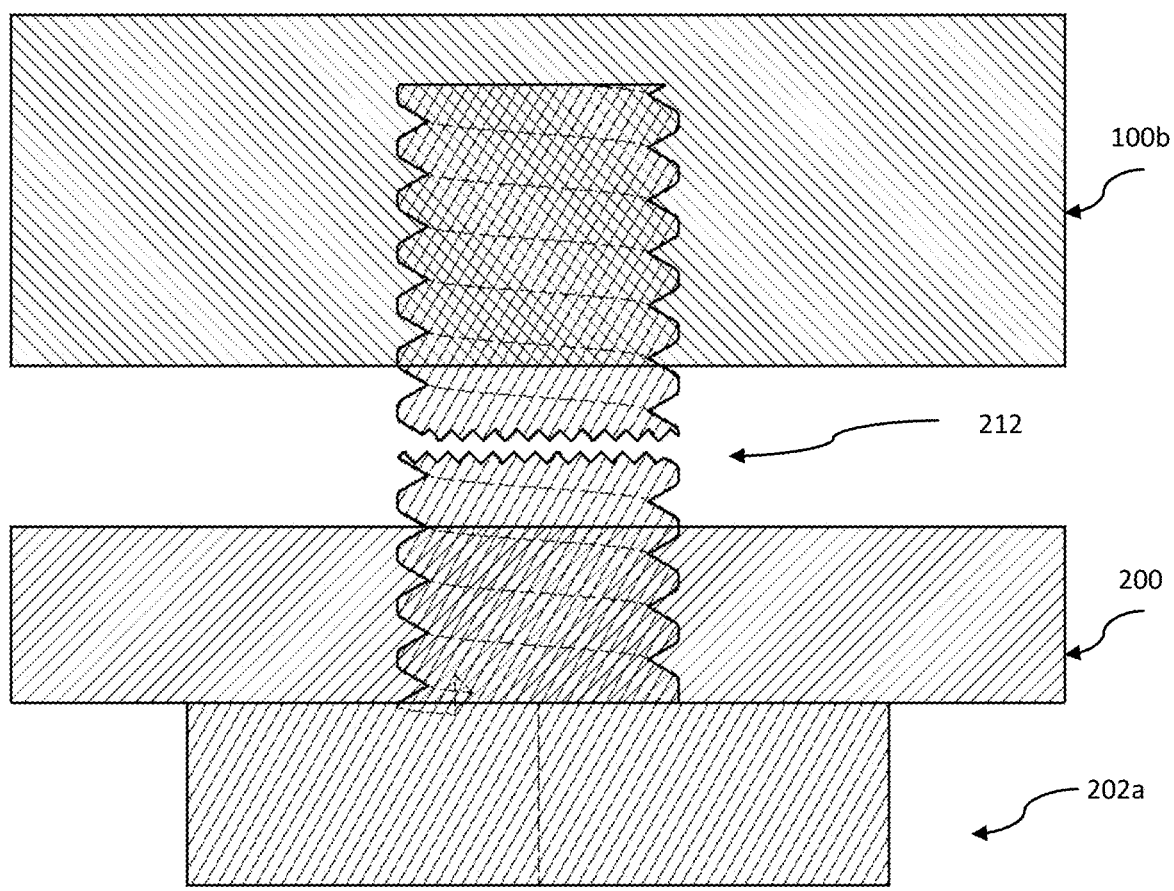
FIG. 6D shows a section view of a data recording apparatus mounting bolt, constructed of two different materials, after the mounting bolt has broken, in accordance with an embodiment.

FIG. 6D shows a section view of a data recording apparatus mounting bolt 202, constructed of two different materials, as installed to attach a data recording apparatus 100 to a data recording apparatus holding well 200, after the mounting bolt 202 is broken, in accordance with an embodiment. FIG. 6D shows similar features as in FIGS. 6A-6D, which are not repeated here.

Location(s) of Data Recording Apparatus and Mounding Well

FIGS. 7A-7F show locations of the data recording apparatus 100 and data recording apparatus mounting well 200 in embodiments of the disclosure.

Figure 7A:
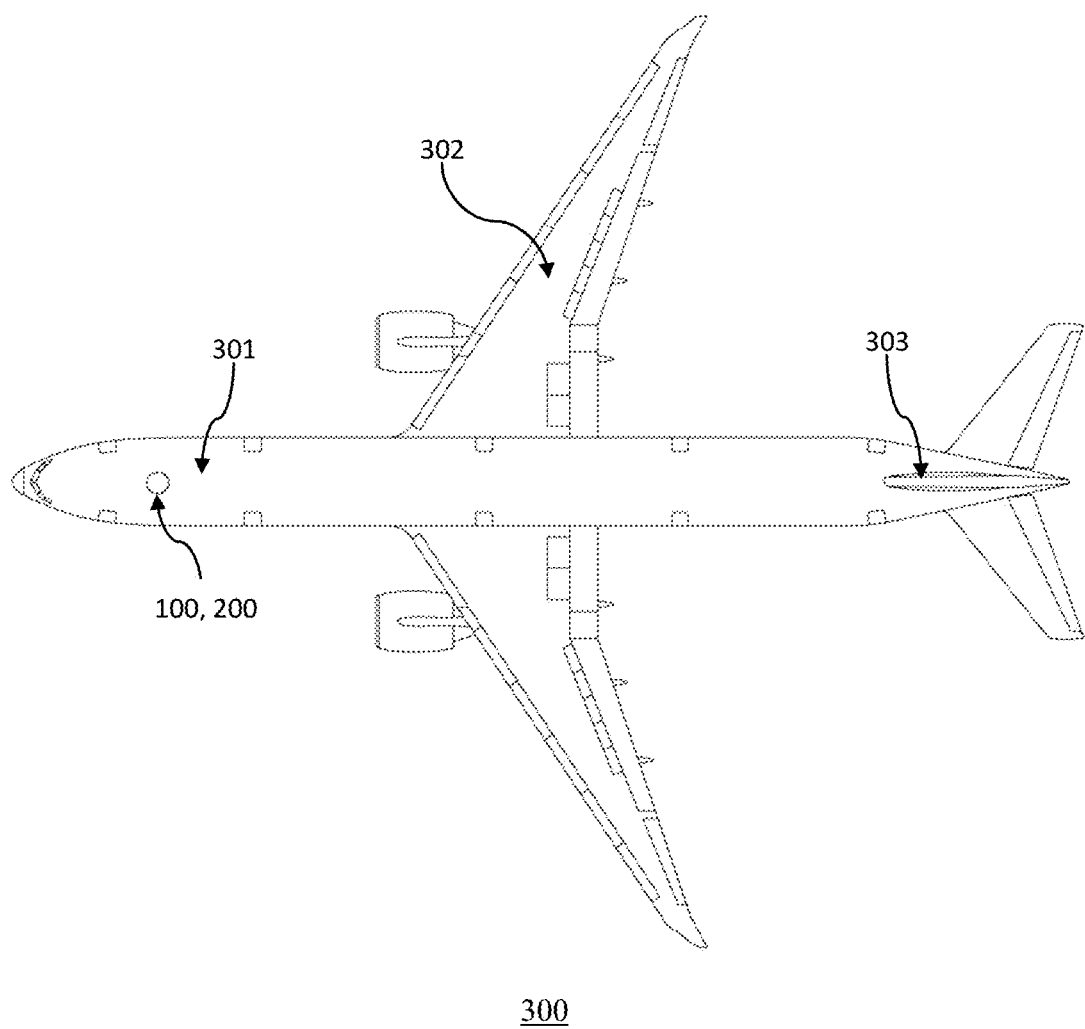
FIG. 7A shows a top view of a data recording apparatus installed on a fuselage of an airplane near front portion of the airplane, in accordance with an embodiment.

For example, FIG. 7A shows atop view of a data recording apparatus 100 installed on an airplane 300, in accordance with an embodiment. As shown in FIG. 7A, according to an embodiment, the data recording apparatus 100 and the mounting well 200 may be located on a top side of an airplane 300 near a cockpit area 301 of the airplane 300. FIG. 7A also shows a wing 302 of the airplane 300.

Figure 7B:
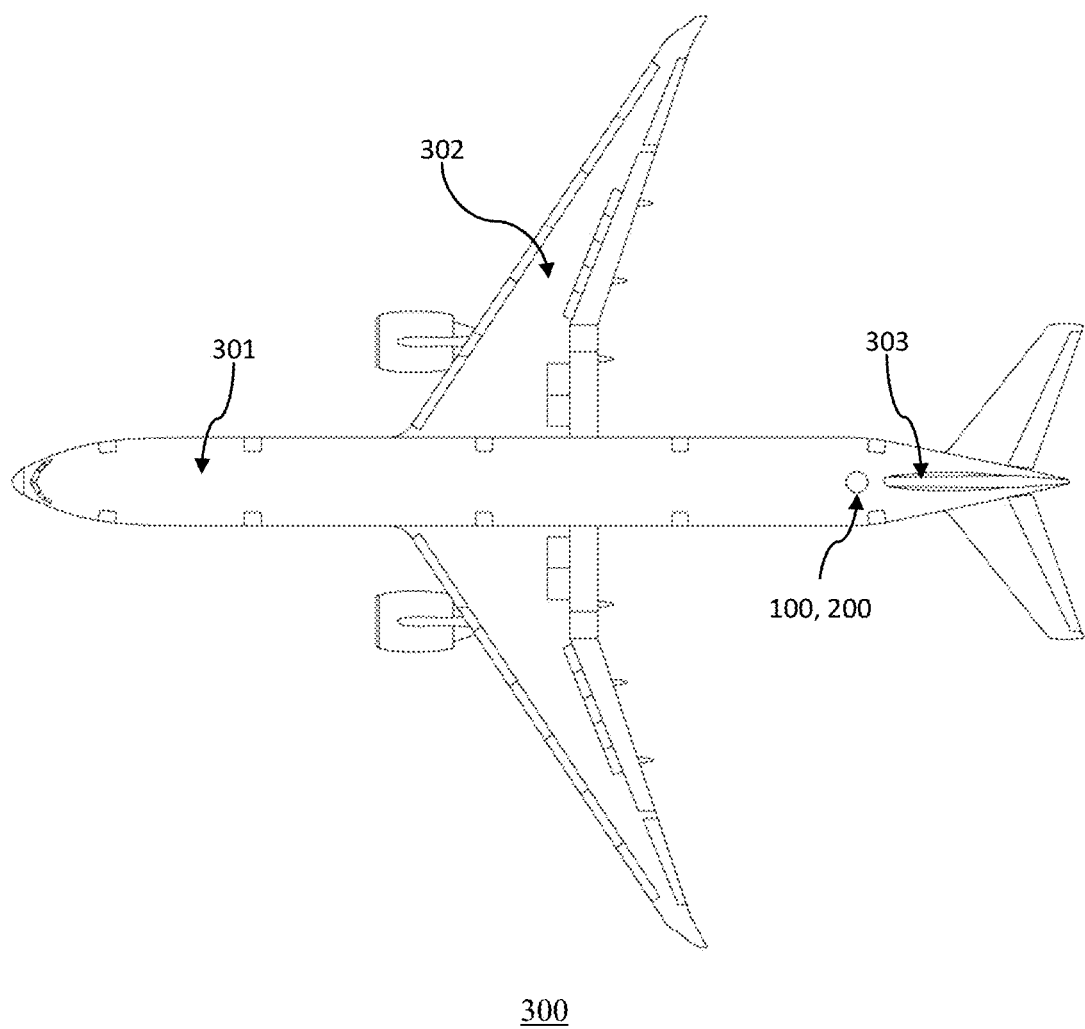
FIG. 7B shows a top view of a data recording apparatus installed on a fuselage of an airplane near rear portion of the airplane, in accordance with an embodiment.

For example, as shown in FIG. 7B, according to an embodiment, the data recording apparatus 100 and the mounting well 200 may be located on a top side of an airplane 300 near a bottom of vertical stabilizer area 303 of the airplane 300. FIG. 7B shows a top view of a data recording apparatus 100 installed on an airplane 300, in accordance with an embodiment. FIG. 7B shows similar features as in FIG. 7A, which are not repeated here.

Figure 7C:
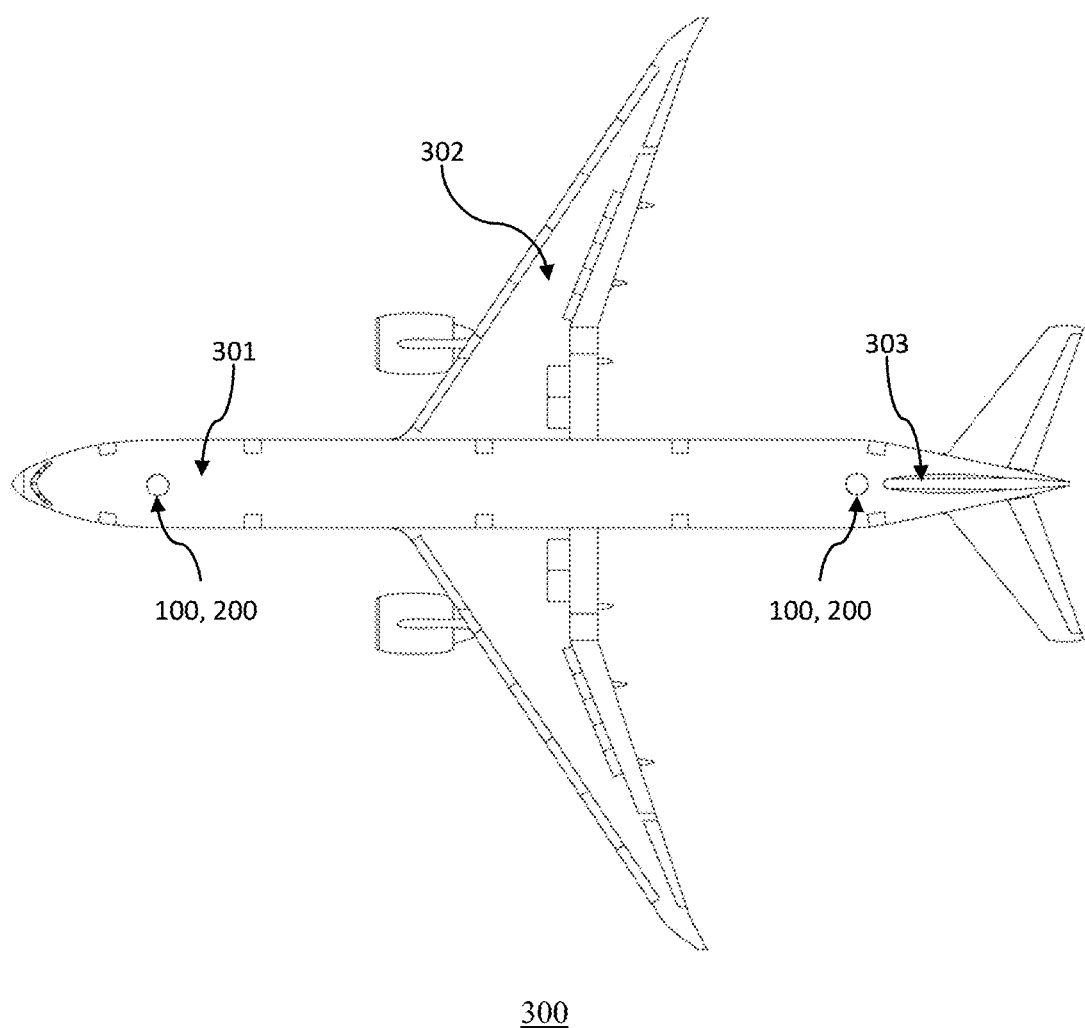
FIG. 7C shows a top view of two data recording apparatuses installed on a fuselage of an airplane, in accordance with an embodiment.
Figure 7D:
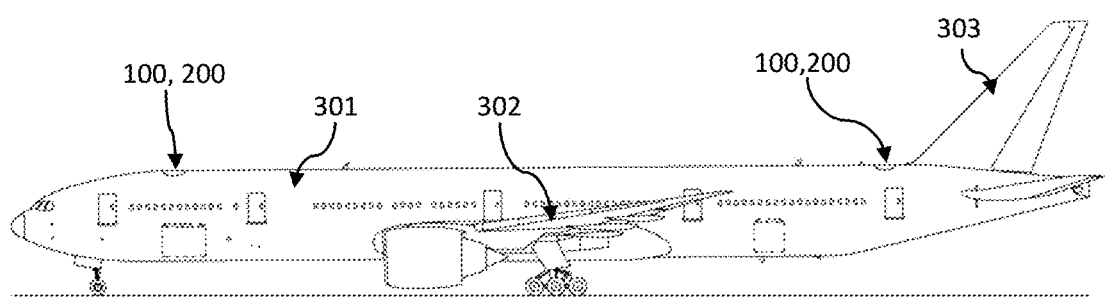
FIG. 7D shows a side view of two data recording apparatuses installed on a fuselage of an airplane, in accordance with an embodiment.

According to an embodiment, as shown in FIGS. 7C and 7D, two data recording apparatuses 100 and two corresponding mounting well 200 may be provided at two different locations on the airplane 300.

FIG. 7C shows atop view of two data recording apparatuses 100 installed on an airplane 300, in accordance with an embodiment.

FIG. 7C shows similar features as in FIGS. 7A and 7B, which are not repeated here. As shown in FIG. 7C, two data recording apparatuses provided on the airplane 300 may include one data recording apparatus 100 provided near the cockpit area 301 and one data recording apparatus 100 provided near the bottom of vertical stabilizer area 303. Each data recording apparatus 100 may be mounted in a corresponding mounting well 200. Although two data recording apparatuses 100 are shown, more than two (e.g., three or four) or only one may be used.

As discussed above, the data recording apparatus 100, may be installed on the top side of the airplane 300 in two mounting wells 200. According to an embodiment, one data recording apparatus 100 may be installed close to the cockpit area 301 and another data recording apparatus 100 may be installed close to a front side of the base of the vertical stabilizer (i.e., in a vertical stabilizer area 303). FIG. 7D shows a side view of two data recording apparatuses installed on an airplane, in accordance with an embodiment. FIG. 7D shows similar features as in FIGS. 7A-7C, which are not repeated here.

FIGS. 7C and 7D show dual unit (dual data recording apparatuses) design, which provides data redundancy, according to an embodiment. For example, statistics show that the back of an airplane usually experiences a greater chance of survival. For this reasons, black boxes are typically located in the rear. However, since most avionics equipments are located at the front of the airplane (close to the cockpit), broken wires caused by various reasons can cause black boxes located near the rear of the airplane to record no data.

Figure 7E:
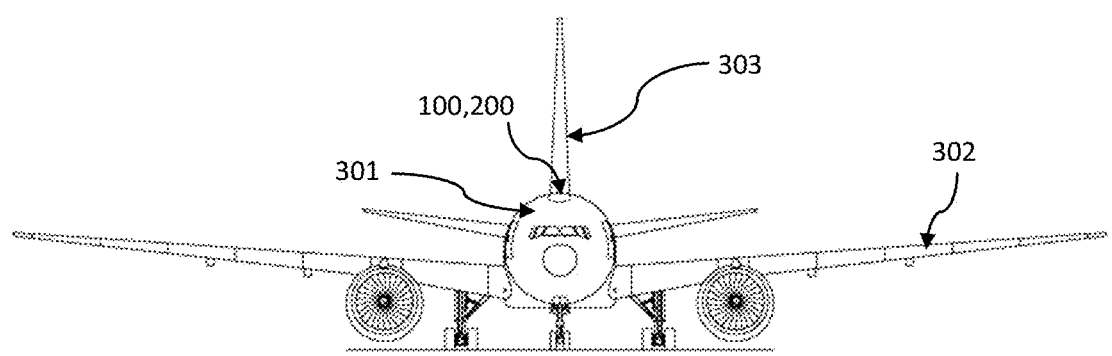
FIG. 7E shows a front view of a data recording apparatus installed on a front (cockpit area) location of a fuselage of an airplane, in accordance with an embodiment.

FIG. 7E shows a front view of the data recording apparatus 100 installed on a front (cockpit area) location of an airplane, in accordance with an embodiment. FIG. 7E shows similar features as in FIGS. 7A-7D, which are not repeated here.

Figure 7F:
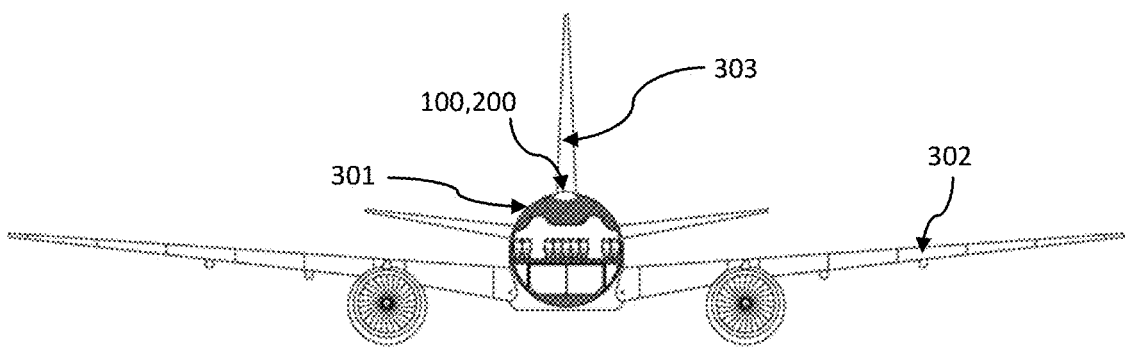
FIG. 7F shows a front sectional view of a data recording apparatus installed on a front (cockpit area) or rear location of a fuselage of an airplane, in accordance with an embodiment.

FIG. 7F shows a front sectional view of the data recording apparatus 100 installed on a front (cockpit area) or rear location of an airplane, in accordance with an embodiment. FIG. 7F shows similar features as in FIGS. 7A-7E, which are not repeated here.

For example, for large airplanes, two data recording apparatuses may be installed. One data recording apparatus 100 can be located towards the front of the airplane. Another data recording apparatus 100 can be located at the location close to the base of vertical stabilizer. This configuration provides redundancy on data storage. One of them can be setup as a "primary". The other one can be setup as "secondary". Since the data recording apparatus is a passive device, which may not have active control function in the operation of the airplane, the data recording apparatuses can be treated as "listening" devices that receive data from FDAU simultaneously.

The redundant dual-data recording apparatus design makes sure that the airplane has at least one unit survive the violent crash or mid-air explosion.

Airplane Orientation and Integrity Determination Method

Moreover, regarding determining the airplane's orientation, because both data recording apparatuses may get and record the same information from the airplane, they may have their own different GPS coordinates. Besides redundancy, using two data recording apparatuses can help accident investigators determine the airplane's orientation based on their respective GPS coordinates by using another apparatus, which is an electronic device. The electronic device may be any electronic device that is capable of reading the information stored in the memory of the data recording apparatus, such as, a server, computer, laptop, smartphone, PDA, or the like. The electronic device can use the GPS coordinates to pinpoint a specific location of an object on Earth, including its altitude. The electronic device may use two of these GPS coordinates (with corresponding altitudes) in three-dimensional space to draw a line. In the dual-data recording apparatuses setup, this line may represent the center line of the main body of the airplane 300. This center line of the airplane main body may be extremely useful when the transportation safety investigators reconstruct the flight and accident because they will know exactly how the airplane behaved and was orientated. Based on the distance between the respective GPS locations of the two data recording apparatuses, the accident investigator can tell when the airplane body breaks apart. This will be a piece of valuable information that the related art cannot produce.

Figure 8A:
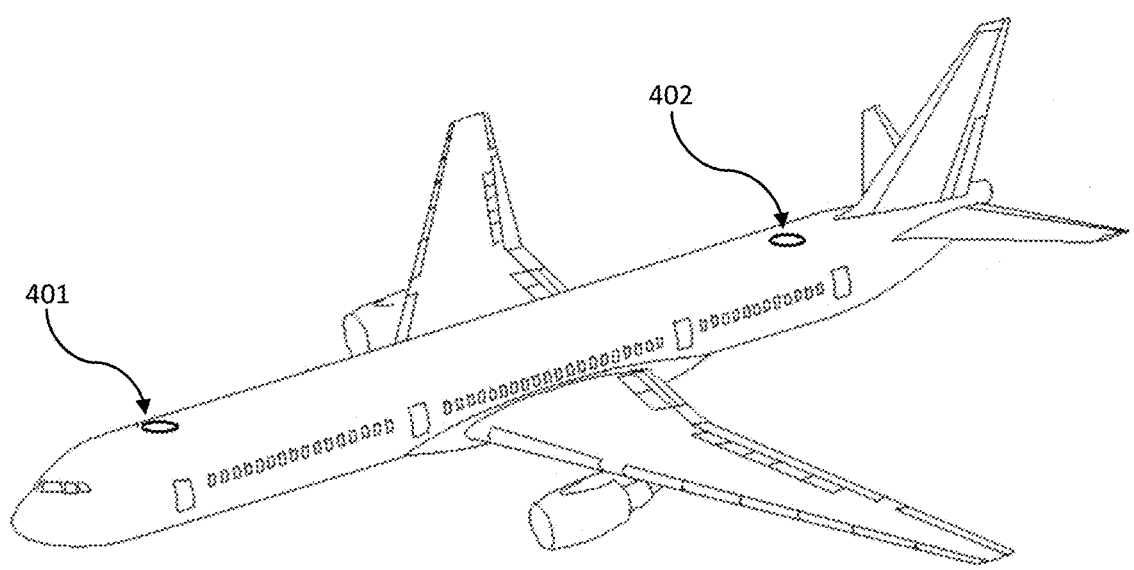
FIG. 8A shows a perspective view of two data recording apparatuses installed on a fuselage of an airplane, in accordance with an embodiment.

For example, FIG. 8A shows a perspective view of two data recording apparatuses installed on a fuselage of an airplane, in accordance with an embodiment. A first data recording apparatus 401 may be installed on a first portion of the fuselage (e.g., at the front part of the airplane) and a second data recording apparatus 402 may be installed on a second portion of the fuselage (e.g., near the bottom of the vertical stabilizer). The goal should be that, in a case that the airplane breaks into at least two pieces, two of the at least two pieces have a data processing apparatus. These two data recording apparatuses 401 and 402 may have their own respective GPS coordinates. For example, GPS coordinates of the first (front) data recording apparatus 401 may be different from those of the second (rear) data recording apparatus 402. If we use A to represent data recording apparatus 401, its position can be expressed as $A(X_{401}, Y_{401}, Z_{401})$. If we use B to represent data recording apparatus 402, its position can be expressed as $B(X_{402}, Y_{402}, Z_{402})$. The distance between A and B can be calculated by the formula listed below and should be an airplane-specific constant.

$$AB=\sqrt{(X_{401}-X_{402})^2+(Y_{401}-Y_{402})^2+(Z_{401}-Z_{402})^2}$$

To be able to draw such a line to represent the centerline of the airplane is very useful for accident investigation. The investigators will be able to know the airplane's movement and orientation.

Figure 8B:
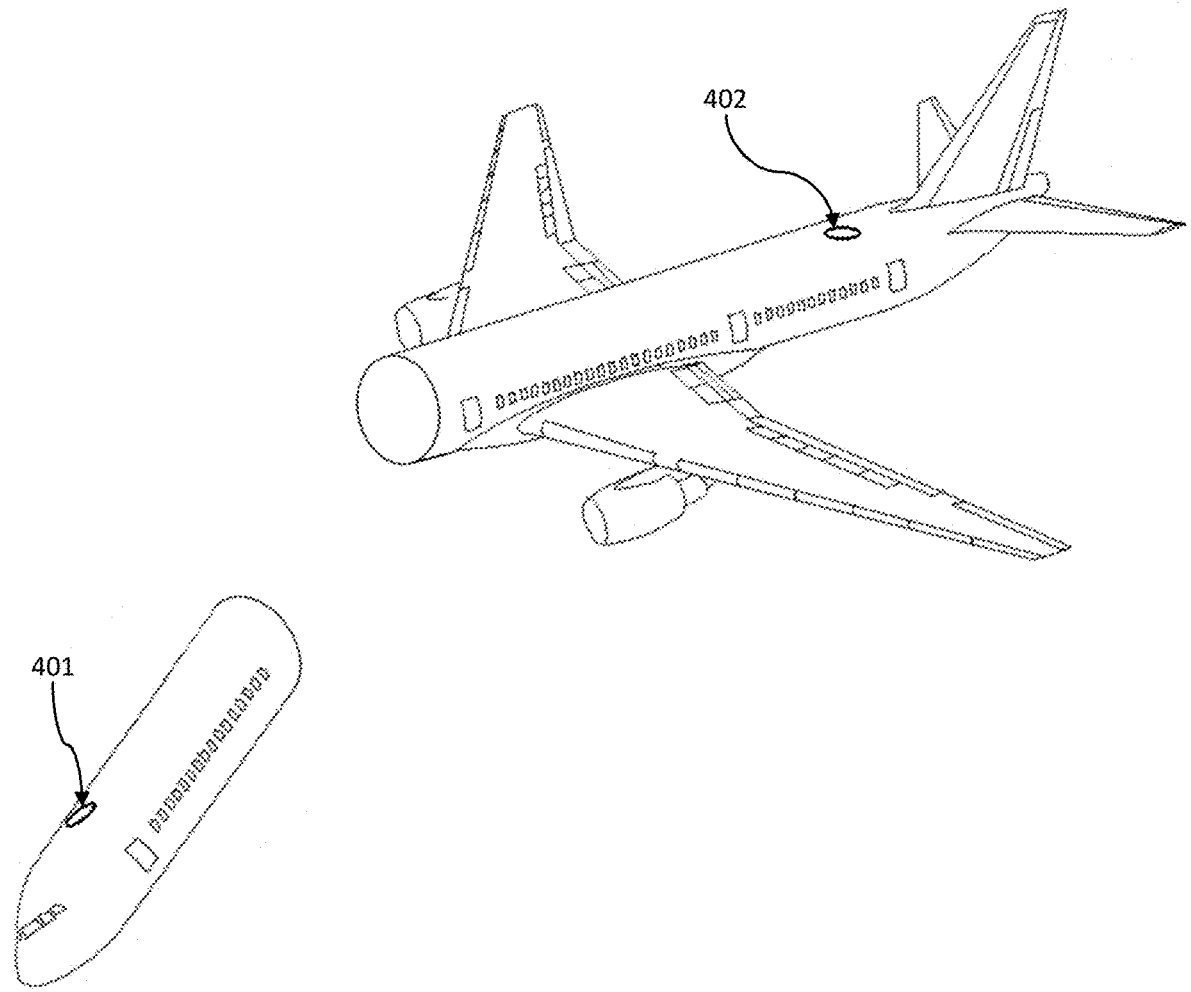
FIG. 8B shows the airplane in FIG. 8A after bodily integrity of the airplane has been compromised.

FIG. 8B shows the airplane in FIG. 8A after bodily integrity of the airplane has been compromised. Most likely at that moment of the bodily integrity being compromised, both data and power links from the airplane may be lost at both data recording apparatus locations. Each data recording apparatus may detect that it is in an emergency state and continues getting and recording its GPS coordinates on one of its memories.

When the accident investigators reconstruct the accident using the proposed determination method, they will be able to read GPS coordinates (obtained during the emergency state), and use that data to calculate, AB, the distance between the two data recording apparatuses. The moment of a new AB value that is greater than that airplane-specific constant is the time that the airplane broke apart.

For example, a typical distance between two data recording apparatuses may be 150 ft. for a Boeing 777. The calculated distance between two data recording apparatuses, AB, should remain 150 ft. When the newer calculated AB starts getting bigger, it means that the airplane integrity has been compromised (i.e. the airplane fell apart).

Data Storage Encryption

Most accidents happen involve multiple governments and jurisdictions. Due to lacking of trust among parties involved, there is a need for information encryption to prevent unauthorized access and potential evidence tampering or alteration.

The present disclosure proposes a data encryption method having a multi-passcode encryption key. When the airplane is delivered, an airplane manufacturer, an airplane owner, an operator, an insurance company and a government aviation administration may all choose their own passcodes and save them to the data recording apparatus. In an embodiment, the data files can only be read after all correct passcodes are entered to ensure legitimacy of the access of the data.

"Initial startup" is defined as the moment airplane is delivered for commercial use. At that moment forward, the data storage should be protected. When the data recording apparatus starts up, it checks if it is the initial startup. If it is, it prompts the users to enter passcodes in certain format (e.g. length, letters or numbers). If all passcodes are entered successfully, data recording apparatus's program encrypts all memories that store flight data.

When data recording apparatus is recovered after accident happens, the investigators can decrypt the media and read data after all stakeholders (airplane manufacturer, airplane owner, operator, insurance company and government aviation administration, etc.) enter valid passcodes.

GPS Data Stored in Data Recording Apparatus

According to an embodiment, GPS coordinates can be stored locally in each data recording apparatus. GPS coordinates are constantly transmitted to a centralized server via satellite communications. If an accident occurs, GPS coordinates received by a centralized server may be used for search and rescue mission(s) to locate the airplane. During the investigation, accident investigators can use GPS coordinates to determine the airplane's orientation. In an embodiment, the centralized server's job is to log airplane's GPS coordinates data and use those data to locate the airplane.

When the data recording apparatus is under normal airplane operations, the data recording apparatus gets GPS coordinates and stores them on the memories on real time basis (e.g. 10 times/second). The data recording apparatus may send its GPS coordinates to a centralized server at normal rate (e.g. once every minute) via satellite communication interface. The GPS information received by the centralized server has sufficient details and can be used for search and rescue mission if accident happens.

After the data recording apparatus is recovered, the investigators can get GPS coordinates information from the data recording apparatus at much higher resolution due to high sample rate.

Data Recording Apparatus Operations

Figure 9:
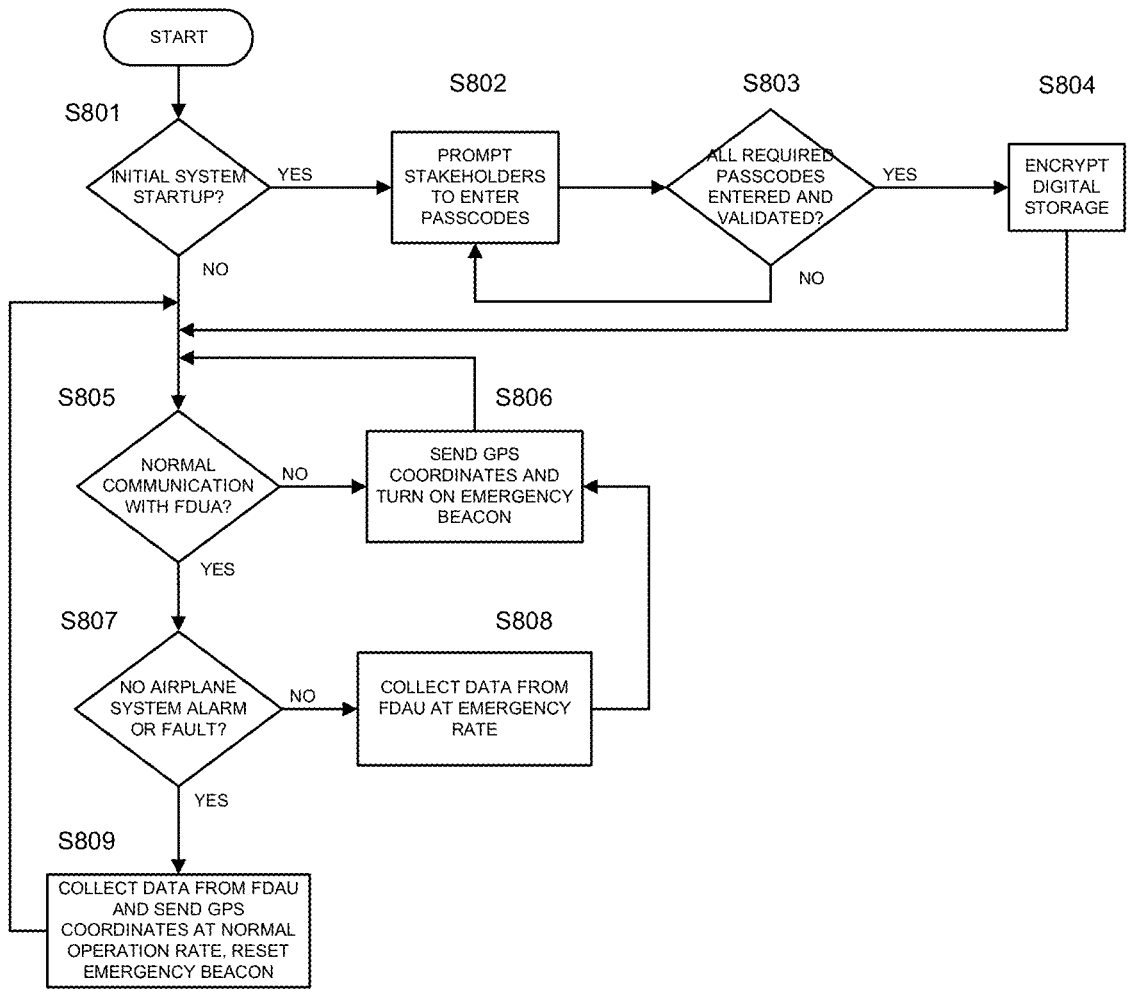
FIG. 9 shows a logic diagram (flowchart) of a processor or controller of a data recording apparatus, in accordance with an embodiment.

FIG. 9 shows a logic diagram (flowchart) of a processor or controller 107 of a data recording apparatus, in accordance with an embodiment. As discussed above, the controller 107 may be configured to execute code (instructions code) stored in the memory 110, which causes the controller 107 to execute a series of steps.

The series of steps may include data encryption that requires multiple passcodes. Due to the lower cost and larger capacity of the memory unit, the data recording apparatus can record beyond the flight data and voice in the cockpit. It can, if permitted by applicable law, record both sound and video in the passenger cabin, cargo bay and other mechanical or electrical panel space.

It becomes increasingly important for airliners, airplane manufacturers and government agencies to have first-hand evidence to understand the root cause of accidents if they happen. The airplane can lose body integrity either from external flying objects or from disruptive activities from the passengers.

Moreover, regarding data encryption, most accidents that happen involve multiple governments and jurisdictions. Due to lacking of trust among parties involved, there is a need for information encryption to prevent unauthorized access and potential evidence tampering or alteration.

With reference to FIG. 8, according to an embodiment, when the data recording apparatus 100 is powered on, the controller 107 may determine whether or not the startup is an initial startup (Step S801). "Initial startup" is defined as the moment airplane is delivered for commercial use. If the startup is an initial startup, the controller 107 may transmit (via the wireless communication interface) information that prompts/asks users to enter passcode information (e.g., all passcodes) (Step S802). Based on users entering all of the required passcode information in response to the prompt, the controller 107 may validate all passcodes entered (Step S803). Based on validating all passcodes entered, the controller may encrypt the digital data storage (e.g., the memory) (Step S804). According to an embodiment, no one can access (e.g., read, write or copy) the encrypted data storage without correctly entering all of the required passcodes. Of course, the required passcodes may include one passcode or multiple passcodes (e.g., 2, 3 or more).

Since it is a safety device required by the regulatory agency, according to an embodiment, anyone involved will be the representative of a business entity or government agency. In an embodiment, the code entered should be linked to an entity rather than an individual.

Data encryption and decryption techniques are usually used in data transmission to prevent unauthorized read. Black box, FDR and CVR, data files are usually saved locally. Additionally, the only access party used to be NTSB under FAA in the US. So, there is no federal requirement to encrypt the data files. FAA doesn't require data encryption.

However, in today's global economy, airplane manufacturer, owner, operator, insurance provider and applicable regulating government agency may locate in different countries. For example, after a 2019 Boeing 737 accident, Ethiopian Airlines sent the black box to the European Union (EU) for analysis, even Boeing and NTSB offered to help. Mistrust among entities is obvious.

According to an embodiment, a multi-passcode system to encrypt and decrypt the digital files may be used. Data tempering can go either way when liability is involved. To have a multi-passcode protection is fair for all shareholders.

According to an embodiment, adding multiple passcodes from different stakeholders to encrypt the digital data storage seems may be useful (necessary) in this day and age to protect all parties. In the related art, these files can be read by anyone. Since, the files are now in electronic format, the tampering risk is enormous. When trust level is at an all-time low, file encryption is useful and could be multilateral.

Referring back to FIG. 8, if the controller determines in Step S801 that the startup is not an initial startup (Step S801: No), the controller may determine whether or not normal communication with FDAU is established (Step S805). If normal communication with FDAU is not established, the controller 107 may perform at least one of the followings: transmitting data, such as GPS coordinates, or controlling an emergency beacon to turn on (e.g., flash intermittently, or stay on without flashing) (Step S806). In Step S806, the GPS coordinates may be transmitted and the emergency beacon may be turned on, or one or the other may be performed. Step S806 is performed based on the assumption that, if normal communication with FDAU is not established, the airplane may be in a compromised situation, such as loss of power, or airplane system failure, such as, because of an accident, an explosion or a crash.

According to an embodiment, based on either communication between the data recording apparatus 100 and FDAU or the power connection between the data recording apparatus 100 and the airplane 300 being broken, the controller 107 may consider the airplane in an emergency situation and perform at least one of the following tasks: turn on the beacon, obtain data from the airplane at a faster rate (an emergency rate as discussed throughout the disclosure), transmit its GPS coordinates, or at a faster rate, and transmit a distress signal.

In Step S807, if normal communication has been established, the controller may check to determine whether there is any alarm or fault based on data transmitted by FDAU to the wireless communication interface 104. Based on determining that there is an alarm or fault based on data transmitted by FDAU to the wireless communication interface 104 (in Step S807), the controller, in Step S808, may pull or start to pull airplane data at a faster rate (e.g., an emergency rate) than a rate at which the airplane data is pulled in a normal situation where no alarm or fault has been detected. The faster (or emergency) rate may allow the controller to collect much more data when the alarm or fault happens. For example, airplane data pulled from FDAU may be pulled more frequently (faster rate) when an alarm or fault has been detected than the frequency with which airplane data is pulled when no alarm or fault has been detected. Moreover, when a fault or alarm has been detected, the same, more or different types of data may be pulled. The additional data pulled under the faster/emergency rate provides an investigator more data points to analyze the situation and find root causes.

Based on determining, in Step S807, that there is no alarm and no fault based on data transmitted by FDAU to the wireless communication interface 104 (e.g., if everything is fine), the controller, in Step S809, may collect data (e.g., flight data, airplane related data) from FDAU at a normal operation rate and transmit, via the satellite communication interface 108, GPS coordinates periodically (e.g., to devices of authorized parties).

The software to perform one or more of Steps S801-S809 can be coded using any appropriate computer programming langue or code, which may be complied, linked or assembled to create code comprising computer code or instructions that can be executed by one or more processors.

While the disclosure describes several exemplary embodiments, there are various equivalent substitutes, and modifications, which are within the scope of the present disclosure. Those of ordinary skill in the art will be able to appreciate different embodiments, although not expressly disclosed or shown in the present disclosure, embody concepts in the disclosure and are thus within the scope of the disclosure.

The invention claimed is:

1. A data recording apparatus comprising:
a housing;
a wireless communication interface configured to communicate with a Flight Data Acquisition Unit (FDAU) located inside of an airplane via near field communication (NFC) or Bluetooth communication;
one or more memories that store executable code;
one or more processors configured to execute the executable code, which causes the one or more processors to:
control the wireless communication interface to obtain flight data from the FDAU using the NFC or Bluetooth communication, wherein the flight data includes one or more of: altitude, airspeed, heading, or aircraft attitude; and
store the obtained flight data in the one or more memories; and
an attachment means for attaching the housing directly or indirectly to an outer surface of the fuselage of the airplane:
wherein the attachment means has a portion having a tensile strength that causes the attachment means to break when an airplane crash occurs.

2. A data recording apparatus comprising:
a housing;
a wireless communication interface;
one or more memories that store executable code; and
one or more processors configured to execute the executable code, which causes the one or more processors to:
control the wireless communication interface to obtain data from a Flight Data Acquisition Unit (FDAU); and
store the obtained data in the one or more memories, wherein
the data recording apparatus further comprises an attachment means for attaching the housing directly or indirectly to an outer surface of the fuselage of an airplane, and
the attachment means includes one or more mounting bolts that include at least a portion of which has a tensile strength that causes the one or more mounting bolts to break when an airplane crash occurs.

3. The data recording apparatus of claim 2, wherein the one or more mounting bolts each include at least two portions, the at least two portions including a first portion having a first tensile strength and a second portion having a second tensile strength, the first tensile strength being different from the second tensile strength.

4. The data recording apparatus of claim 3, the second tensile strength being so that the one or more mounting bolts is configured to break at the second portion when the airplane crash occurs.

5. The data recording apparatus of claim 3, wherein the second tensile strength is lower than the first tensile strength so that the one or more mounting bolts is configured to break at the second portion when the airplane crash occurs.

6. The data recording apparatus of claim 3, wherein
the one or more mounting bolts each have a third portion,
the first portion and the third portion have the first tensile strength, and
the second portion has the second tensile strength.

7. The data recording apparatus of claim 1, further comprising a beacon, wherein the one or more processors are further configured to execute the executable code, which causes the one or more processors to: cause the beacon to flash intermittently when a predetermined emergency state is detected.

8. A data recording apparatus comprising:
a housing;
a wireless communication interface;
one or more memories that store executable code; and
one or more processors configured to execute the executable code, which causes the one or more processors to:
control the wireless communication interface to obtain data from a Flight Data Acquisition Unit (FDAU); and
store the obtained data in the one or more memories, wherein the one or more processors are further configured to execute the executable code, which causes the one or more processors to:
when powered on, determine whether or not the startup is an initial startup;
when the startup is an initial startup, transmit information to a user terminal that prompts users to enter passcode information under respective roles; and based on all the passcodes being entered, encrypt at least a portion of the memory where flight data is stored.

9. A data recording apparatus comprising:
a housing;
a wireless communication interface;
one or more memories that store executable code; and
one or more processors configured to execute the executable code, which causes the one or more processors to:
control the wireless communication interface to obtain data from a Flight Data Acquisition Unit (FDAU); and
store the obtained data in the one or more memories, wherein the one or more processors are further configured to execute the executable code, which causes the one or more processors to: when powered on, determine whether or not the startup is an initial startup;
when the startup is determined to not be the initial startup, determine whether or not normal communication with the FDAU is established; and
when normal communication with the FDAU is not established, perform at least one of the following things: controlling an emergency beacon to turn on, or transmitting global positioning system (GPS) coordinates via a satellite communication interface.

10. A data recording apparatus comprising:
a housing;
a wireless communication interface configured to communicate with a Flight Data Acquisition Unit (FDAU) located inside of an airplane via near field communication (NFC) or Bluetooth communication:
one or more memories that store executable code; and
one or more processors configured to execute the executable code, which causes the one or more processors to:
control the wireless communication interface to obtain flight data from the FDAU using the NFC or Bluetooth communication, wherein the flight data includes one or more of: altitude, airspeed, heading, or aircraft attitude; and
store the obtained flight data in the one or more memories:
wherein the one or more processors are further configured to execute the executable code, which causes the one or more processors to:
when normal communication with the airplane has been established, check to determine whether there is any alarm, warning, abnormality or fault that has occurred based on data transmitted by the FDAU to the wireless communication interface; and
based on determining that there is an alarm, warning, abnormality or fault that has occurred based on the data transmitted by the FDAU via the wireless communication interface, pull data at a faster data rate than a data rate at which the data is pulled in a normal situation where no alarm, warning, abnormality or fault has been detected, wherein the faster data rate corresponds to increasing a frequency of controlling the communication interface to pull data from the FDAU such that more data is obtained from the FDAU.

11. The data recording apparatus of claim 1, wherein
the housing includes a material and an internal volume that are designed such that the data recording apparatus floats on water,
the housing is a proper size and wall thickness to support itself so as to float in water based on its displacement, and
the wireless communication interface, the one or more memories and the one or more processors are located within the housing.

12. The data recording apparatus of claim 1, further comprising a wireless charging interface and battery.

13. The data recording apparatus of claim 12, wherein the power of the data recording apparatus can only be turned off from outside of the airplane that the data recording apparatus is attached to.

14. A data recording apparatus comprising:
a housing;
a wireless communication interface;
one or more memories that store executable code; and
one or more processors configured to execute the executable code, which causes the one or more processors to:
control the wireless communication interface to obtain data from a Flight Data Acquisition Unit (FDAU); and
store the obtained data in the one or more memories, wherein the one or more processors are configured to:
based on detecting that at least one of a communication connection or a power connection between the data recording apparatus and the FDAU is broken, determine that an airplane is in an emergency state and transmit a distress signal.

15. A system comprising:
a data recording apparatus; and
a mounting well mounted on the outside of a fuselage of an airplane from the inside of the fuselage of the airplane, the mounting well being configured to connect the data recording apparatus to the airplane, wherein the data recording apparatus comprises:
a housing;
a wireless communication interface;
one or more memories that store executable code; and
one or more processors configured to execute the executable code, which causes the one or more processors to:
control the wireless communication interface to obtain data from a Flight Data Acquisition Unit (FDAU); and
store the obtained data in the one or more memories.

16. An airplane comprising:
a data recording apparatus; and
a mounting well mounted on the outside of the fuselage of the airplane from the inside of the fuselage of the airplane, the mounting well being configured to connect the data recording apparatus to the airplane, wherein the data recording apparatus comprises:
a housing;
a wireless communication interface;
one or more memories that store executable code; and
one or more processors configured to execute the executable code, which causes the one or more processors to:
control the wireless communication interface to obtain data from a Flight Data Acquisition Unit (FDAU); and
store the obtained data in the one or more memories.

17. The airplane of claim 16, wherein
the mounting well includes two mounting wells,
a first mounting well of the two mounting wells is positioned on a front portion of the fuselage,
a second mounting well of the two mounting wells is positioned on a rear portion of the fuselage, and
the rear portion of the fuselage is located closer to the vertical stabilizer of an airplane than the front portion of the fuselage.

18. A system comprising:
the airplane of claim 17, and
another data recording apparatus that is different from the data recording apparatus, wherein each of the data recording apparatuses is further configured to store location data regarding global positioning system (GPS) coordinates of the respective data recording apparatuses; and an electronic device that is configured to obtain the GPS coordinates stored in the respective memories of the data recording apparatuses and determine airplane orientation and integrity based on the obtained GPS coordinates.

19. A determination method comprising:

obtaining, by an electronic device, from a memory of a first data recording apparatus, first global positioning system (GPS) coordinates stored in the memory of the first data recording apparatus;

obtaining, by the electronic device, from a memory of a second data recording apparatus, second GPS coordinates stored in the memory of the second data recording apparatus; and based on the obtained first and second GPS coordinates, determining, by the electronic device, orientation and integrity of an airplane that the first and second data recording apparatuses are attached to.

20. A system comprising:

the data recording apparatus of claim 8; and another apparatus, which is an electronic device that is configured to, based on all valid passcodes being entered, decrypt the encrypted at least the portion of the memory where the flight data is stored, the valid passcodes corresponding to each of two or more stakeholders, the two or more stakeholders including two or more of: an airplane manufacturer, an airplane owner, an operator, an insurance company representative or a government aviation administration representative.

* * * * *